(12) United States Patent
Fujimori et al.

(10) Patent No.: US 7,103,508 B2
(45) Date of Patent: Sep. 5, 2006

(54) TEST SYSTEM AND CONTROL METHOD

(75) Inventors: Susumu Fujimori, Kokubunji (JP); Hitoshi Yamashita, Tama (JP)

(73) Assignee: Benesse Corporation

( * ) Notice: Subject to any disclaimer, the term of this patent is extended or adjusted under 35 U.S.C. 154(b) by 0 days.

(21) Appl. No.: 10/529,263

(22) PCT Filed: Sep. 25, 2003

(86) PCT No.: PCT/JP03/12252

§ 371 (c)(1),
(2), (4) Date: Mar. 25, 2005

(87) PCT Pub. No.: WO2004/029906

PCT Pub. Date: Apr. 8, 2004

(65) Prior Publication Data

US 2005/0256663 A1    Nov. 17, 2005

(30) Foreign Application Priority Data

Sep. 25, 2002  (JP) ............................ 2002-279513

(51) Int. Cl.
*G06F 19/00* (2006.01)

(52) U.S. Cl. ..................................... 702/185; 434/322
(58) Field of Classification Search ................ 702/185, 702/182–184; 434/322, 350, 353, 362; 717/124
See application file for complete search history.

(56) References Cited

U.S. PATENT DOCUMENTS

2005/0164155 A1*  7/2005  Okubo ....................... 434/362

* cited by examiner

*Primary Examiner*—Edward Raymond
(74) *Attorney, Agent, or Firm*—Fish & Richardson P.C.

(57) ABSTRACT

A test system realizes in an English ability test, etc. not only binary correct-false evaluation but also a partial score. The test system uses a computer (101, 102) including an input/output device (207, 208) and a network (103) such as the Internet, etc., and uses a partial test score model obtained by amending the conventional Item Response Theory in estimating an item parameter and ability. In the partial test score model, a partial score is assumed to be a true-false average of a plurality of items having the same parameters. Using the test system of the present invention, a test of the presentation format which is hard to determine the correct or wrong answer such as writing and speaking tests in a foreign language test, etc. can be more easily controlled than in the conventional system.

22 Claims, 18 Drawing Sheets

Figure 5

|  | average of 1st trial | average of 2nd trial | average of 3rd trial | variance |
|---|---|---|---|---|
| listening (250 pts.) | 154.2 | 160.8 | 158.2 | 6.6 |
| reading (250 pts.) | 158.5 | 166.9 | 177.0 | 18.5 |
| writing (250 pts.) | 147.1 | 150.9 | 154.8 | 7.7 |
| speaking (250 pts.) | 142.1 | 147.5 | 142.3 | 5.4 |
| total score (1000 pts.) | 601.8 | 625.9 | 632.3 | 30.5 |

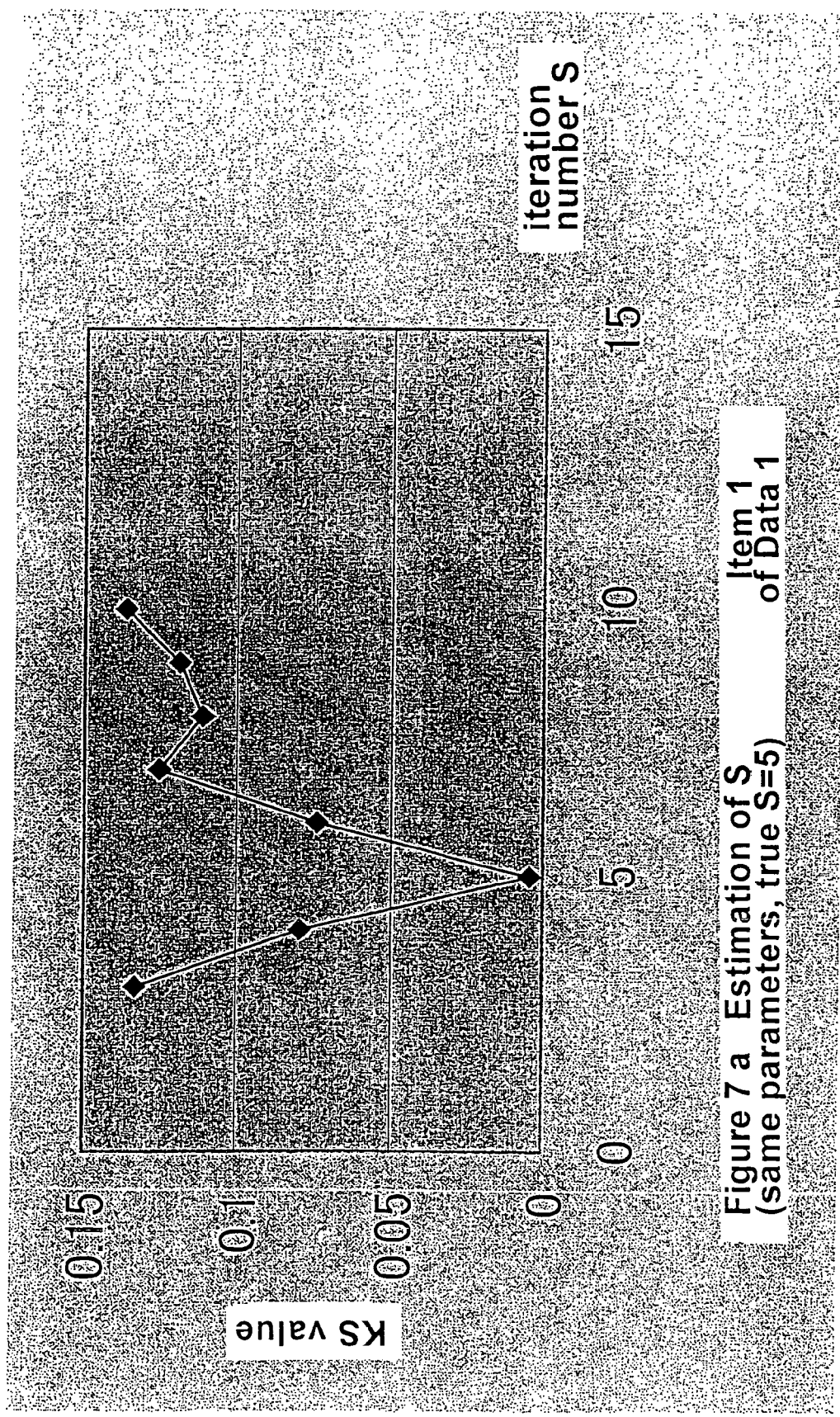
Figure 7a Estimation of S (same parameters, true S=5)

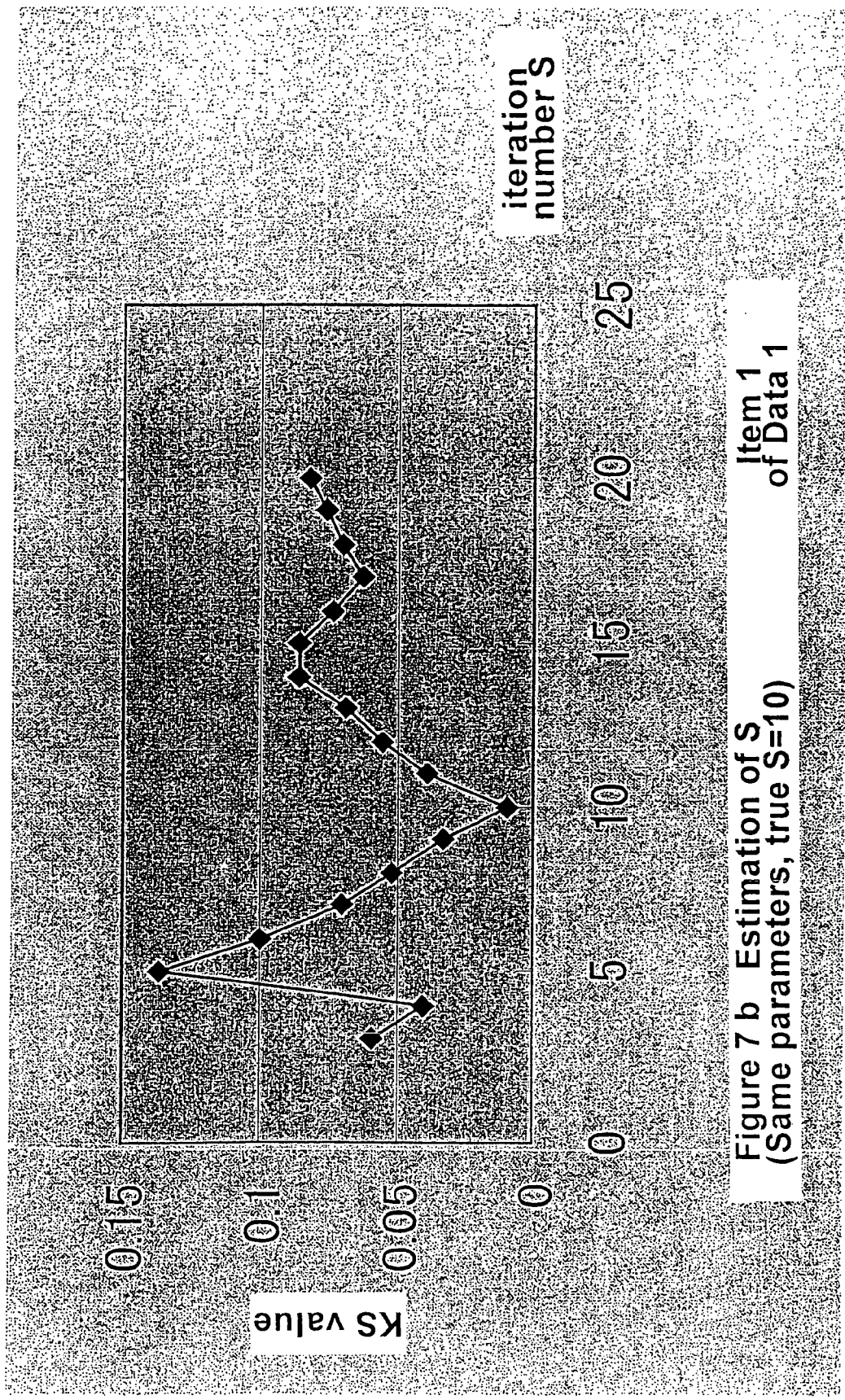
Figure 7 b Estimation of S
(Same parameters, true S=10)

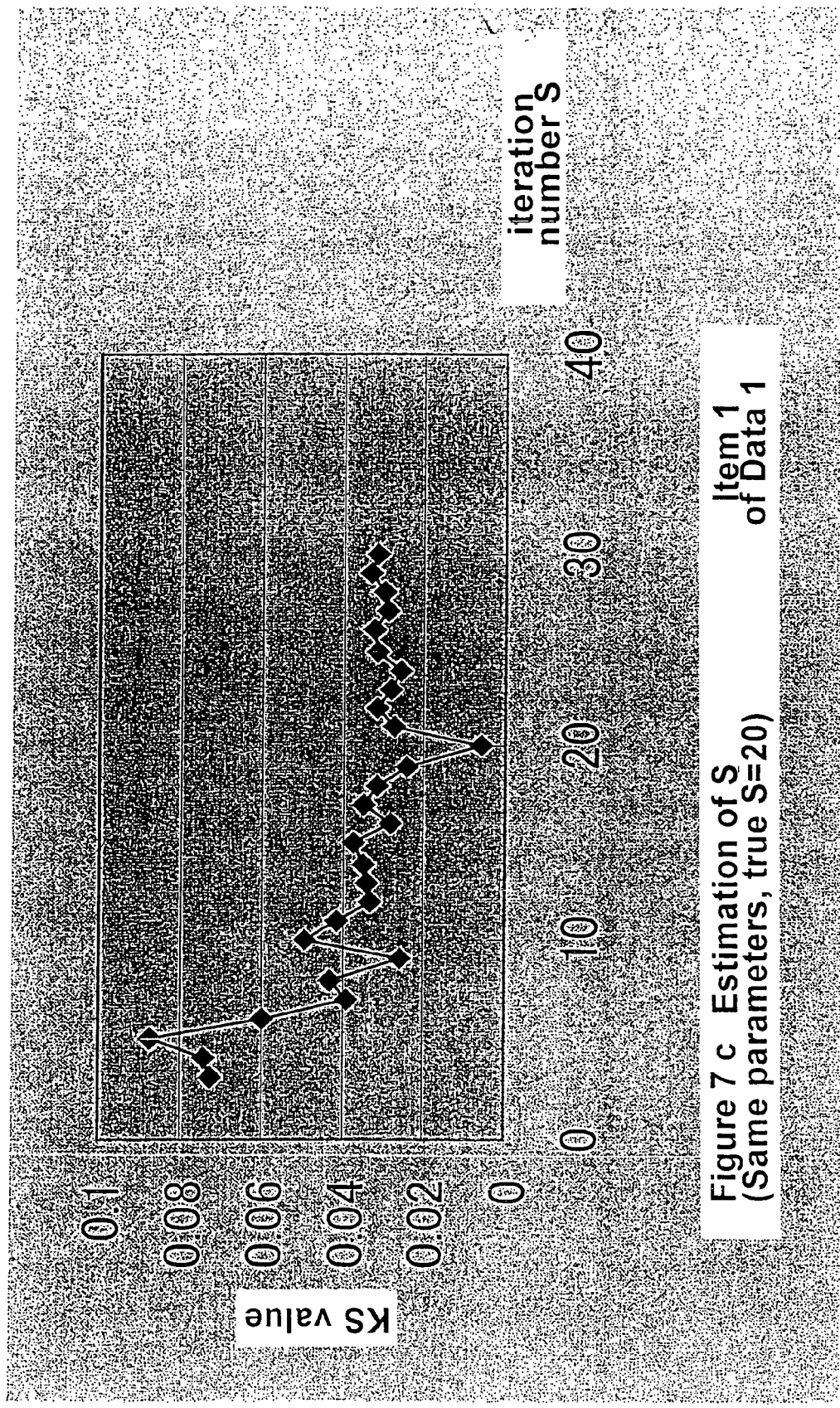
Figure 7 c Estimation of S
(Same parameters, true S=20)

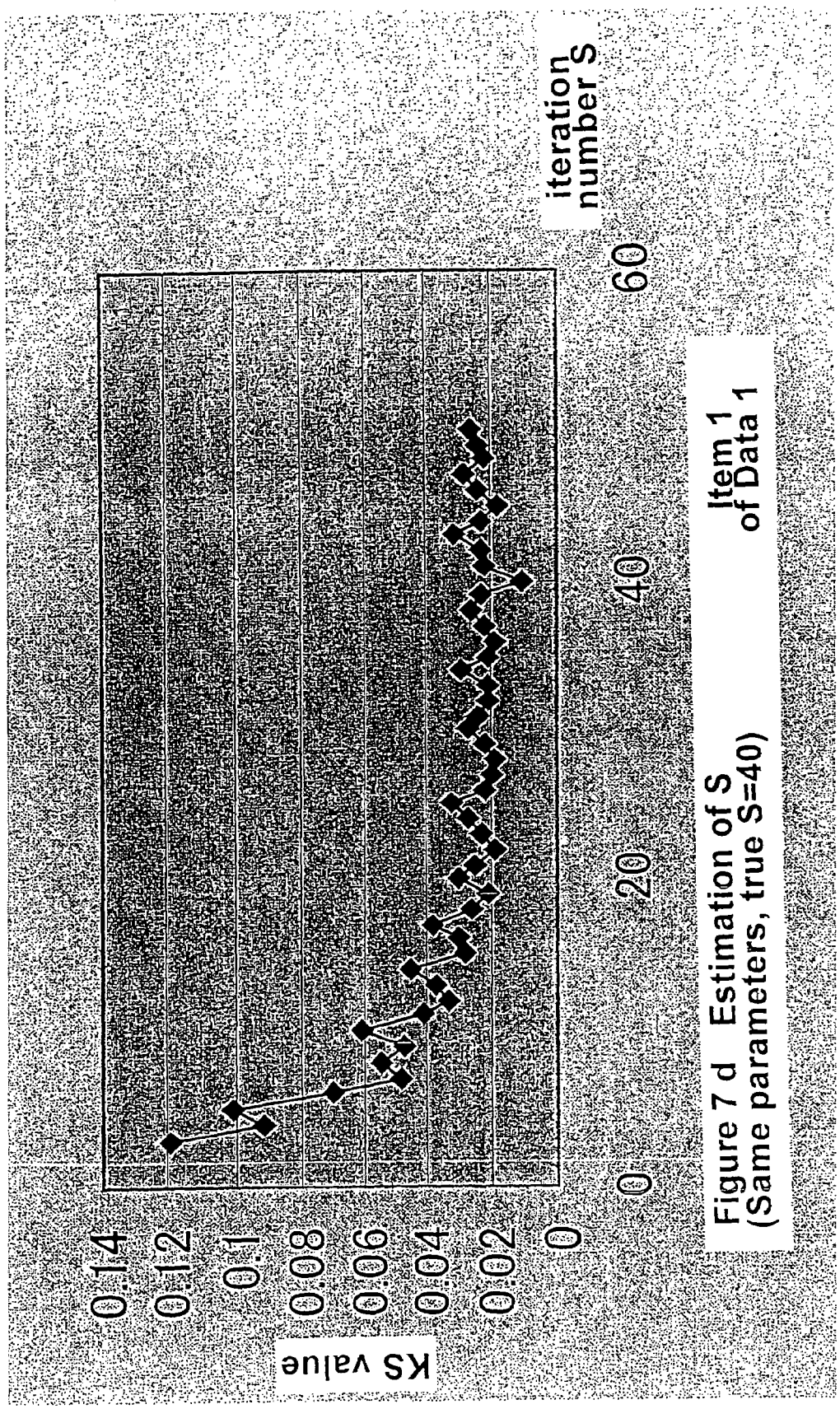
Figure 7 d Estimation of S (Same parameters, true S=40)

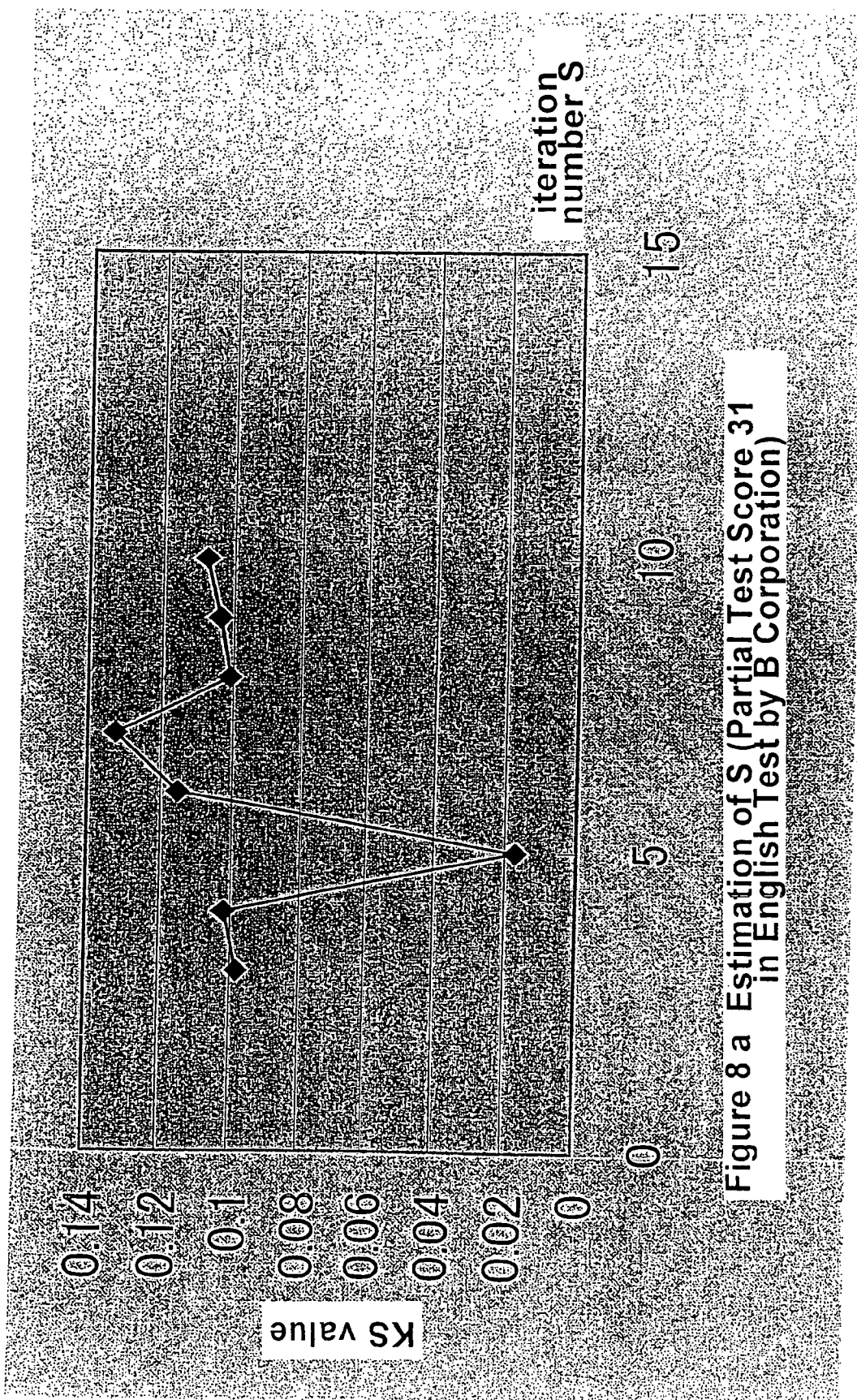
Figure 8 a  Estimation of S (Partial Test Score 31 in English Test by B Corporation)

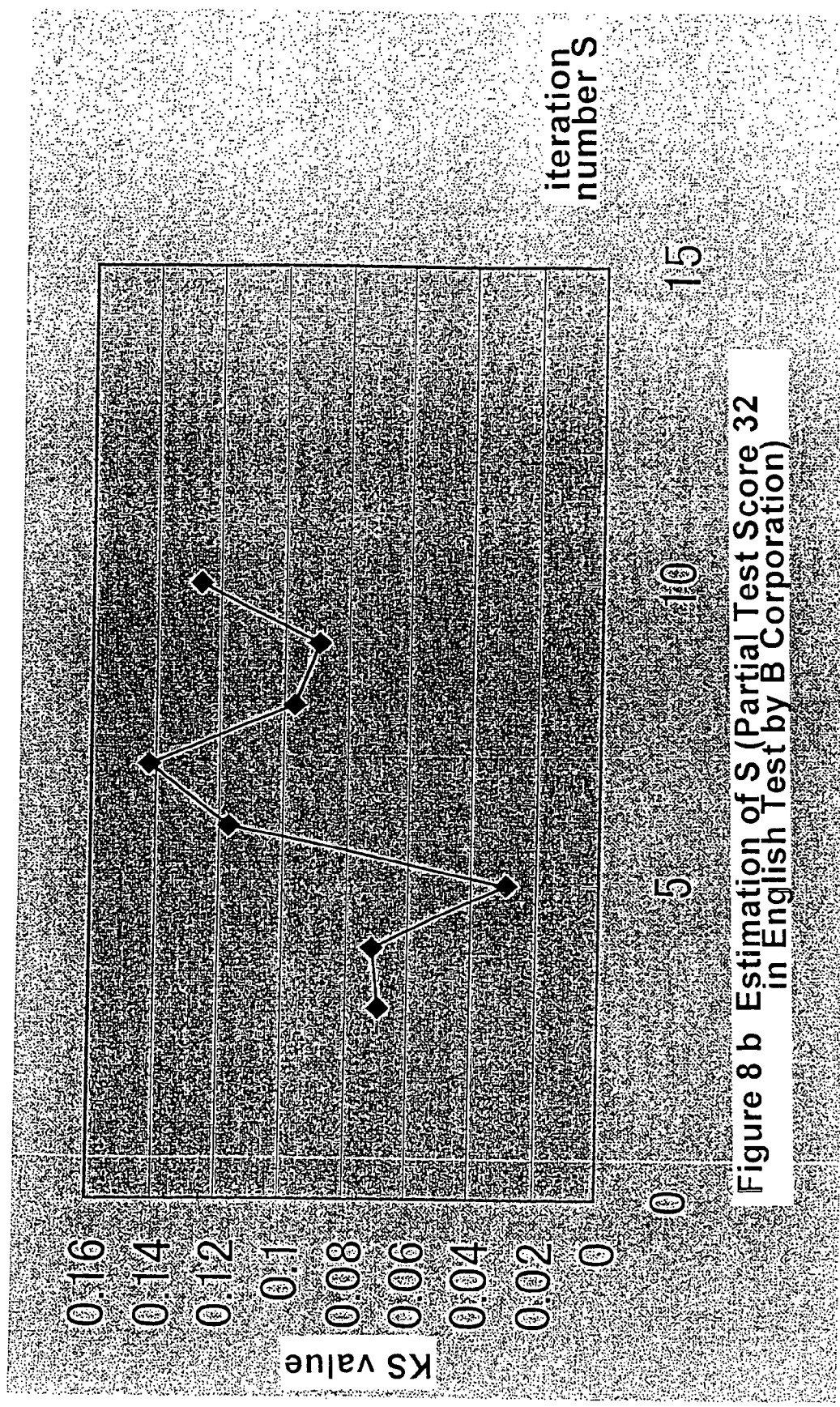
Figure 8 b Estimation of S (Partial Test Score 32 in English Test by B Corporation)

TEST SYSTEM AND CONTROL METHOD

TECHNICAL FIELD

The present invention relates to a test system and its control method. More particularly, the present invention relates to a test system and its control method wherein a modified Item Response Theory called partial test score model is used to design, carry out, and evaluate a test in such a manner that the result of the test can be evaluated as having not only a simple true or false binary value but also a partial score in a plurality of phases in a simpler manner than in prior art test systems.

BACKGROUND ART

Recently, the classical test theory and the Item Response Theory are the two major theories used in designing a test and processing the result of the test. A general introduction to each of the test theories is given in Chapters 6 and 7 of "Statistical Methods in Psychology" edited by Hiroshi Watabe (2002 by Fukumura Shuppan Inc.), respectively. Tests to which test theories are applied includes not only an achievement test, but also a psychological personality test, a clinical examination, etc. In the following description of the present invention, however, instead of presenting an abstract explanation covering these various fields, the inventors try to provide a more specific explanation in relation to achievement tests including foreign language tests in order for the present invention to be understood more readily. An "item" in the Item Response Theory corresponds to a problem in an achievement test. Therefore, in the specific explanation to be given in this specification, well-known terms in an achievement test will be used. For example, the terms "problem" and "testee", which are common in the field of achievement tests, will be used instead of more generic terms "item" and "subject", respectively. However, the present invention is not limited to an achievement test, but can be applied to the above-mentioned various fields to which test theories are applied.

A conclusion reached through the classical test theory, which is widely used, depends on the statistical distribution of the features of a testee. Therefore, when the classical test theory is used, it is not appropriate to compare average marks and deviations obtained in a plurality of tests conducted for a group of testees with different features.

The Item Response Theory has been proposed to overcome the shortcomings of the classical test theory. At present, there are a number of achievement tests which are designed and whose result are processed based on the Item Response Theory. For example, the following description can be seen in "Introduction to the Item Response Theory" by Hideki Toyoda (2002 by Asakura Shoten), on page 16. "TOEFL Examination, a famous language test, is conducted several times a year all over the world. Since one subject may sit for the test more than once, the same test cannot be presented as a group of the same items. Therefore, the average values and the passing rates are different among the tests. Since the ability in English varies in accordance with the areas, the distribution of the characteristic values is also different depending on the area. Therefore, it is impossible to compare the test results using the deviations, normal marks, and empirical distribution functions. - - - The marks of TOEFL Examination (for example, 500, 650, etc.) are used in determining the ability of studying abroad regardless of where and when the test was conducted, which problems are solved, etc. That is, although different testees take the examinations consisting of different items on different dates at different places, these testees can be treated with a unified manner. The Item Response Theory is a mathematical model for designing a system that allows such tests to be carried out continuously."

In addition, Japanese Patent Publication No. 2002-006734 discloses a test method and system, wherein problems are pre-arranged in a tree structure, the problems are sequentially presented along a path in the tree structure depending on whether the testee has given the correct answer or the wrong answer to the previous problem, and the ability of a testee is estimated not only based on the number of correct answers, but also based on which path has been followed to the final point in the tree structure. The Item Response Theory is referred to in this published patent application.

However, in item response models based on the conventional theory, it has not been easy to handle a problem other than multiple-choice problems the answers to which can be marked as binary values of 1 or 0. For example, in such models, it is not easy to handle a problem the answer to which inevitably has to be marked as a partial score between 1 and 0. Although graded response models have been proposed to handle multi-valued results, such prior art methods suffer from the shortcomings to be described later. This is why essay or oral tests which cannot be appropriately marked without allowing partial scores are not typically included in a computer adaptive test (CAT). The invention disclosed in the above-mentioned Japanese Patent Publication No. 2002-006734 is an example wherein Item Response Theory is explicitly employed, and wherein the problems to be presented are pre-arranged in a tree structure and when a testee correctly answers a question, the lower right problem will be given as the next problem while when a testee cannot correctly answer the question, the lower left problem will be given as the next problem. Thus, the solution is treated in binary, that is, based on a correct or false answer.

DISCLOSURE OF THE INVENTION

Unlike the CAT which predicts the conventional binary true-false values, the present invention aims at providing a test system and its control method which allow a marking operation for a partial score, and more easily process a partial score than the complicated models such as the conventional graded response model, etc.

According to the present invention, the test system includes a first computer having an input device and an output device, a second computer, connected to the first computer over a network including the Internet, having an input device and an output device, a test management server connected to the first and second computers over the network, and a problem database accessible by the test management server and storing a plurality of problems for which an item parameter including a difficulty level and identifiability is estimated in advance. With the configuration, the test system presents n problems to one testee, and the ability $\theta$ of the testee is evaluated from the response of the testee to the presented n problems. The test management server includes: (1) means for selecting n problems to be marked in an aspect allowing partial score $r_j$ where $0 \leq r_j \leq 1$ with perfect 1 for the problem j where $1 \leq j \leq n$ from the problem database in response to a request transmitted from the first computer, and transmitting the selected problems to the first computer; (2) answer storage means for storing an answer returned from the first computer in response to the problem selected from the problem database and transmitted to the first computer; (3) means for reading an answer stored in the answer storage means in response to the request transmitted from the second computer, and transmitting the read answer to the second computer; (4) partial score storage means for receiving a partial score $r_j$ assigned to the answer transmitted to the second computer from the second computer, and storing it; and (5) ability prediction means for estimating the ability θ of a testee who acquires the partial score $r_j$ using the partial score $r_j$ stored in the partial score storage means and the item parameter of the problem j stored in the problem database. In the ability prediction means, $P_j(θ)$ refers to the probability that the testee can correctly answer the latent problem assuming that the partial score $r_j$ is proper to the problem j and is an average value of true-false response which the testee latently indicates when the latent problems to which the testee latently indicates the response of the correct answer of 1 or the wrong response of 0 are repeatedly performed $s_j$ times, and is represented as follows.

$$P_j(θ) = \frac{1}{1 + \exp(-Da_j(θ - b_j))} \qquad \text{[Equation 1]}$$

When $a_j$ and $b_j$ respectively indicate the identifiability and the difficulty level which are the proper feature of the problem stored in the problem database, D is a constant of 1.7, and $Q_j(θ)$ is $1-P_j(θ)$, the ability θ of the testee is estimated using the logarithmic likelihood $l_{part}(θ)$ represented by the following Equation.

$$\ell_{part}(θ) = \sum_{j=1}^{n} s_j(r_j \ln(P_j(θ)) + (1 - r_j)\ln(Q_j(θ))) \qquad \text{[Equation 2]}$$

where the function form of $P_j(θ)$ represented as Equation 1 is only an example. That is, it is not necessary to limit $P_j(θ)$ to this representation format, but can be represented in various formats.

It is to be noted that a testee can be assigned the partial score $r_j$ which can be observed as the value from 0 to 1 relating to the problem j, and the latent response of the testee to the latent problem cannot be observed.

Furthermore, according to the test system of the present invention, when the observed partial score $r_j$ for the problem j is configured by an average of a plurality of manifest true-false problems, the average value of the correct answer rate of these true-false problems is represented by Equation 1, and the ability θ of a testee can be estimated using Equation 2.

In addition, according to the test system of the present invention, the ability distribution of a group on which a test is conducted is assumed, the product of the binomial distribution, which is a true-false sum of $s_j$, and the assumed ability distribution is integrated by the dimension of the ability to obtain the theoretical distribution function of a partial score, and the $s_j$ which is the iterations of latent problems can be estimated such that the obtained theoretical distribution function can best matches the empirical distribution function of the partial score of the actual data.

Furthermore, in the test system of the present invention, when the output device and the input device of the first and second computers respectively include a voice output device and a voice input device, the voice data can also be included as an answer transmitted to the test server and stored. In this case, a listening problem can be presented by the first computer, and a speaking problem in which the actual utterance of a testee is realized can be presented.

The present invention can also be realized as a method of controlling the above-mentioned test system. Furthermore, the present invention can be a computer-readable storage medium storing a computer program for implementing the test system control method, and can also be a program for executing the test system control method.

BRIEF DESCRIPTION OF THE DRAWINGS

FIG. 5 is a graph showing a result of a score stability confirmation check on 12 testees made to confirm the effectiveness of evaluating the ability using the test system according to the present invention;

FIGS. 7a to 7d are plots of 3 to 10 iterations of the maximum value (Kolmogorov-Smirnov test statistic) indicating the difference in distribution function between the estimated empirical distribution and theoretical distribution when the iterations $s_j$ is estimated with the true s=5, 10, 20, and 40; and FIGS. 8a and 8b show examples of applying the iterations $s_j$ in the English ability test to estimation.

BEST MODE FOR CARRYING OUT THE INVENTION

Figure 1:
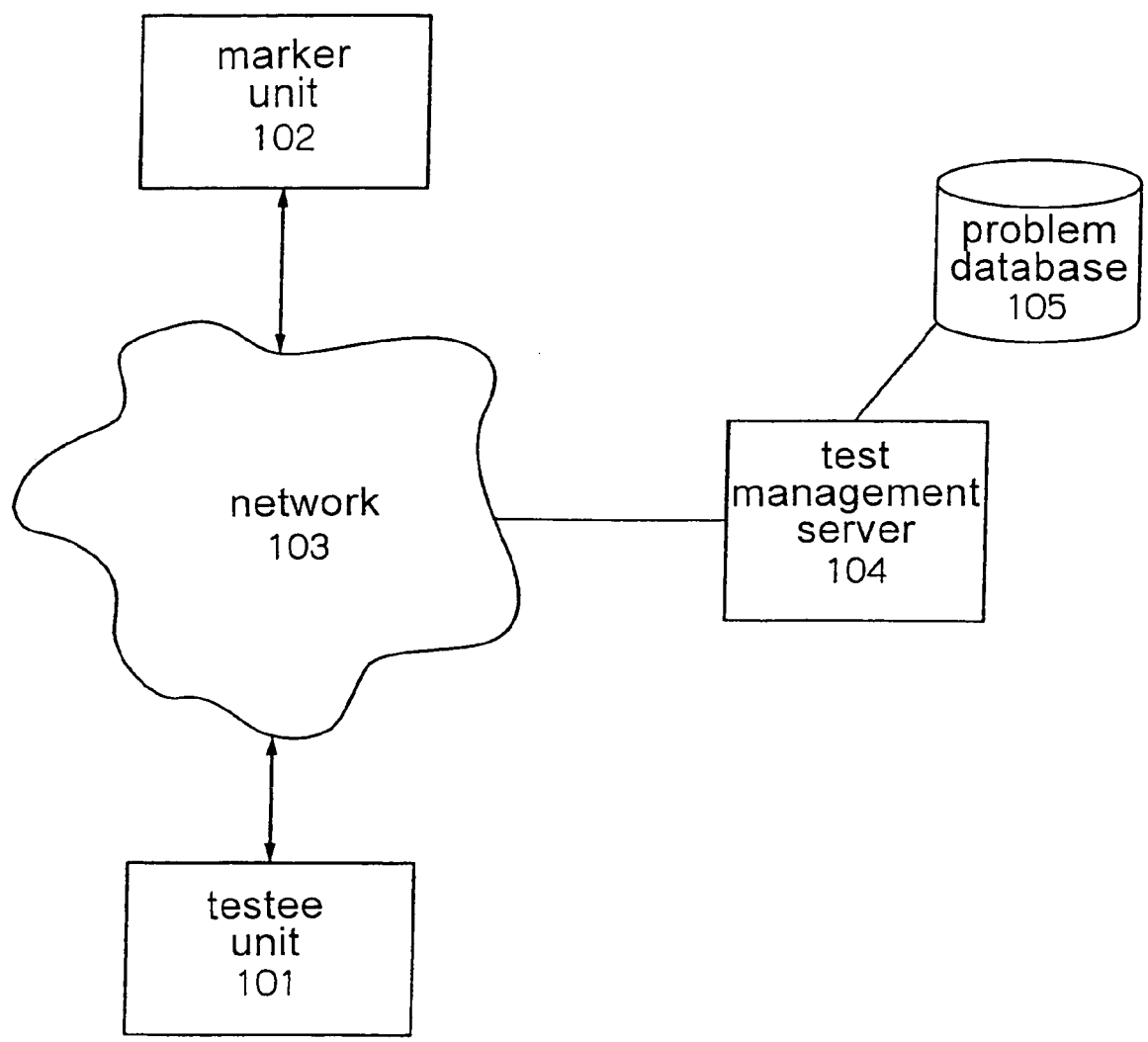
FIG. 1 shows the outline of an example of the test system according to the present invention.

Before describing the partial test score model on which the present invention is based, a typical binary item response model is briefly explained, wherein "binary" means that the theory deals with answers that can be represented by two values in accordance with being correct or wrong. In this model, the probability that a testee correctly answers a problem is represented by a parameter indicative of the ability of the testee and parameters characteristic of the problem. For example, the present invention uses a 2-parameter logistic model in which each problem is characterized by two parameters (identifiability a and difficulty level b). In this case, the probability that a testee i having the ability θ correctly answers a problem j can be represented by the equation shown below:

$$P_j(x_{ij} = 1 \mid θ_i) = \frac{1}{1 + \exp(-Da_j(θ_i - b_j))} \qquad \text{[Equation 3]}$$

wherein x, which is a dummy variable, is 1 if the testee i correctly answers the problem j, and 0 if the testee does not correctly answer it. D is a constant. In this case, the likelihood $L_B(\theta)$ of the ability $\theta$ of the testee when he/she has finished answering n problems can be represented by the equation shown below:

$$L_B(\theta) = \prod_j^n P_j^{x_j}(\theta) Q_j^{1-x_j}(\theta) \qquad \text{[Equation 4]}$$

where $P(\theta)$ is the probability that the testee i correctly answers the problem j as expressed in the right side of Equation 3 while $Q(\theta)$ is the probability that the testee i does not correctly answer the problem j, which is $1-P(\theta)$. In the Item Response Theory, such a value of $\theta$ that maximizes the likelihood $L_B(\theta)$ of Equation 4 is estimated as the ability of the testee, which is widely used and is referred to as the maximum likelihood method. However, since the right side of Equation 4 is written as a product form and its maximization is not easy, it is common to rewrite the product form as a sum form by taking the natural logarithm of each side of the equation, and to try to obtain the maximum value of the logarithmic likelihood in $(L_B(\theta))$. Such operation is allowed because the natural logarithm is a simply increasing function, and the likelihood $LB(\theta)$ and its natural logarithm in $(L_B(\theta))$ are maximized at the same value of $\theta$.

Described above is the conventionally well-known common 2-parameter logistic model. However, in the partial test score model used in the present invention, the evaluation of the response (answer) to a problem is not limited to a binary true-false answer, but a partial score can be evaluated. Practically, the present invention allows the dummy variable $x_j$ of Equation 4 to be other than binary, that is, not limited to 1 or 0, but to take three or more values between 0 and 1 (for example, six values of 0, 0.2, 0.4, 0.6, 0.8, and 1). Assuming that the partial score of the testee i for the problem j is $r_{ij}$, the likelihood corresponding to such a partial score can be written as follows:

$$L_{part}(\theta_i) = \prod_j^n P_j^{r_{ij}}(\theta_i) Q_j^{1-r_{ij}}(\theta_i) \qquad \text{[Equation 5]}$$

In an actual foreign language (for example, English) test, a true-false problem and a multiple choice problem can be processed using binary true-false values. However, it is difficult to evaluate an essay or a speech (oral response to a question) problem simply as being correct or wrong, and thus it is necessary to give a partial score to such a problem. Accordingly, the conventional binary item response model cannot be used. However, according to Equation 5, the resultant marks of a test in any format can be converted into a partial score format to be used as data for an further analysis.

To interpret the meaning of Equation 5, let us assume that $s_j$ problems having the same problem parameters are presented to a single testee. In an achievement test, problems having the same parameters but different contents may be given. On the other hand, in a questionnaire used in a personality test, problems having both the same parameters and the same contents may be given, which can contradict the assumption of local independence on which the Item Response Theory is based. Therefore, it is assumed in the following description that problems having the same parameters but different contents should be given.

In a conventional item response model, the likelihood under the above-mentioned conditions can be written as follows using Equation 4:

$$\begin{aligned} L_B(\theta_i) &= \prod_j^n \prod_k^{s_j} P_j^{x_{ijk}}(\theta_i) Q_j^{1-x_{ijk}}(\theta_i) \qquad \text{[Equation 6]} \\ &= \prod_j^n P_j^{\sum_k^{s_j} x_{ijk}}(\theta_i) Q_j^{\sum_k^{s_j}(1-x_{ijk})}(\theta_i) \end{aligned}$$

Assuming that the iterative answers $s_j$ are equal ($=s$) for all problems, the following equation can be obtained by calculating the s-th root of each side of Equation 6.

$$\begin{aligned} L_B^*(\theta_i) &= \sqrt[s]{L_B(\theta_i)} \qquad \text{[Equation 7]} \\ &= \sqrt[s]{\prod_j^n P_j^{\sum_k^s x_{ijk}}(\theta_i) Q_j^{\sum_k^s (1-x_{ijk})}(\theta_i)} \\ &= \prod_j^n P_j^{\frac{\sum_k^s x_{ijk}}{s}}(\theta_i) Q_j^{1-\frac{\sum_k^s x_{ijk}}{s}}(\theta_i) \end{aligned}$$

Since both $L_B(\theta)$ and $L_B(\theta)^*$ are maximized at the same $\theta$, the estimated maximum likelihood values will be the same in Equation 6 and Equation 7. If Equation 7 is rewritten using the following relationship, $L_{part}(\theta)$ will be equal to $L_B^*(\theta)$ in format.

$$\frac{\sum_k^s x_{ijk}}{s} = r_j \qquad \text{[Equation 8]}$$

That is, when a partial score is represented by an average of the true-false marks in the iterated problems having the same parameters, the solution of the partial test score model $L_{part}(\theta)$ on which the present invention is based matches the solution of $L_B(\theta)$ in the conventional Item Response Theory through $L_B^*(\theta)$. Therefore, the partial score between 0 and 1 is obtained by obtaining the average value of the results of the corresponding items when the partial score of the record is to be obtained by performing a plurality of times the same parameter and obtaining the true-false sum or the average value. Thus, processing using the partial test score model $L_{part}(\theta)$ gives the same result as processing using the conventional binary data. From Equation 8, increasing the presented $s_j$ actually leads to the representation of any partial score from 0 to 1. Since it is inconvenient to have the difference by root of s-th power between Equation 6 and Equation 7, it is desired to have the logarithmic likelihood for the partial score as the natural logarithm by obtaining the s-th power of Equation 5.

$$\ell_{part} = \sum_{j=1}^{n} s\{r_j \ln(P_j(\theta)) + (1-r_j)\ln(Q_j(\theta))\} \quad \text{[Equation 9]}$$

In the actual achievement test, a plurality of problems relating to one another can be presented. For example, in a foreign language test, a plurality of problems can be presented for a sentence of a fixed length. However, the presence of a group of these problems may be contradictory to the assumption of local independence.

Based on the factor analysis, if a store z of a test is configured by a factor $f_1$ on the entire test problems, a factor $f_2$ common to a problem group J, and an independent factor u, then the store of the testee i on the problem j can be represented as follows.

$$z_{ij} = f_{i1}a_{1j} + f_{i2}a_{2j} + u_j \quad \text{[Equation 10]}$$

where a indicates the factor load. If the problem j belongs to the problem group J, then $a_{2j}$ is not 0. When the problem j belongs to the problem group J, $a_{2j}=0$. In Equation 10, a sum on the problem group J can be obtained as follows.

$$\sum_J z_{ij} = \sum_J f_{i1}a_{1j} + \sum_J f_{i2}a_{2j} + \sum_J u_j \quad \text{[Equation 11]}$$

where the second term of the right side indicates the sum on the factor $f_2$ common in the problem group J. However, based on the assumption of the orthogonality of factors, it is an independent portion without the correlation to other problems. Since a proper component is assumed in an item in the Item Response Theory, the second term of the right side corresponds to this. That is, the assumption of local independence is not stated. Assuming that the factor $f_1$ is the ability parameter θ in the Item Response Theory, it is not undesired to process the sum of related problem group in a test as a partial score. To perform the process suggested in the present invention on the problems having local subordinate relationship is preferable from the assumption in the Item Response Theory.

Assuming the iterations of an item of a similar parameter, not an item of perfectly the same parameter, the likelihood of common binary depends on the true-false pattern of iterative presentation of the item j as follows.

$$L_B(\theta_i) = \prod_{j}^{n} \prod_{k}^{s_j} P_{jk}^{x_{jk}}(\theta) Q_{jk}^{1-x_{ijk}}(\theta) \quad \text{[Equation 12]}$$

where θ is fixed, and the item parameter is given. The logarithmic likelihood of Equation 12 is obtained, and the portion relating to the similar item j is retrieved as follows.

$$l_{B(j)} = \sum_{k=1}^{s} (x_k \ln(P_k) + (1-x_k)\ln(1-P_k)) \quad \text{[Equation 13]}$$

(where the subscript j and θ are omitted for the correct answer rate, etc.) Then, the expected value relating to the true-false response X is obtained as follows.

$$E(l_{B(j)}) = \sum_{k=1}^{s} (P_k \ln(P_k) + (1-P_k)\ln(1-P_k)) \quad \text{[Equation 14]}$$

Furthermore, if the following Equations 15 and 16 hold, $\Delta P_k$ is assumed to be very small because each item is a similar item.

$$\bar{P} = \frac{1}{s}\sum_{k=1}^{s} P_k \quad \text{[Equation 15]}$$

$$P_k - \bar{P} = \Delta P_k \quad \text{[Equation 16]}$$

If the term over a quadric value in $\Delta P_k$ is ignored, the following Equations 17 and 18 hold.

$$\begin{aligned}P_k \ln(P_k) &= (\bar{P}+\Delta P_k)\ln(\bar{P}+\Delta P_k) \\ &\cong (\bar{P}+\Delta P_k)\left(\ln(\bar{P})+\Delta P_k \times \frac{1}{\bar{P}}\right) \\ &\cong \bar{P}\ln(\bar{P}) + \Delta P_k \ln(\bar{P}) + \Delta P_k\end{aligned} \quad \text{[Equation 17]}$$

$$\begin{aligned}(1-P_k)\ln(1-P_k) &= (1-\bar{P}-\Delta P_k)\ln(1-\bar{P}-\Delta P_k) \\ &\cong (1-\bar{P}-\Delta P_k)\left\{\ln(1-\bar{P})-\Delta P_k \times \frac{1}{1-\bar{P}}\right\} \\ &\cong (1-\bar{P})\ln(1-\bar{P}) - \Delta P_k - \Delta P_k \ln(1-\bar{P})\end{aligned} \quad \text{[Equation 18]}$$

When Equations 17 and 18 are substituted for Equation 14, and the following Equation 19 is taken into account, Equation 20 holds.

$$\sum_{k=1}^{s} \Delta P_k = 0 \quad \text{[Equation 19]}$$

$$\begin{aligned} E(l_{B(j)}) &\cong \sum_{k=1}^{s} \{\overline{P}\ln(\overline{P}) + (1-\overline{P})\ln(1-\overline{P})\} + \ln\left(\frac{\overline{P}}{1-\overline{P}}\right)\sum_{k=1}^{s} \Delta P_k \\ &= \sum_{k=1}^{s} \{\overline{P}\ln(\overline{P}) + (1-\overline{P})\ln(1-\overline{P})\} \\ &= s\{\overline{P}\ln(\overline{P}) + (1-\overline{P})\ln(1-\overline{P})\} \end{aligned} \quad \text{[Equation 20]}$$

The partial score is considered as follows. As described above, if it is assumed that the iterative answer $s_j$ is equal (=s) in all items, the correct answer rate of Equation 9 is replaced with the average response probability of Equation 15 and Equation 21 as follows.

$$\overline{Q}_j(\theta) = 1 - \overline{P}_j(\theta) \quad \text{[Equation 21]}$$

Then the following Equation holds.

$$l_{part} = \sum_{j=1}^{n} s\{r_j \ln(\overline{P}_j(\theta)) + (1-r_j)\ln(\overline{Q}_j(\theta))\} \quad \text{[Equation 22]}$$

Only the portions related to the specific similar problem j is retrieved from the equation above, and since the partial score r is a true-false average of the similar problem j, the following Equation holds.

$$l_{part(j)} = s\left\{\frac{\sum_{k=1}^{s} x_k}{s}\ln(\overline{P}) + \left(1 - \frac{\sum_{k=1}^{s} x_k}{s}\right)\ln(1-\overline{P})\right\} \quad \text{[Equation 23]}$$

(where the subscript j and θ are omitted for the correct answer rate, etc.) Then, the expected value is represented as follows.

$$\begin{aligned} E(l_{part(j)}) &= s\left\{\frac{1}{s}\ln(\overline{P}) \times E\left(\sum_{k=1}^{s} x_k\right) + \ln(1-\overline{P}) \times E\left(1 - \frac{\sum_{k=1}^{s} x_k}{s}\right)\right\} \\ &= s\left\{\frac{1}{s}\ln(\overline{P}) \times \sum_{k=1}^{s} P_k + \ln(1-\overline{P}) \times \left(1 - \frac{1}{s}\sum_{k=1}^{s} P_k\right)\right\} \\ &= s\{\overline{P}\ln(\overline{P}) + (1-\overline{P})\ln(1-\overline{P})\} \end{aligned} \quad \text{[Equation 24]}$$

From Equations 20 and 24, the following Equation holds.

$$E(l_{B(j)}) \cong E(l_{part(j)}) \quad \text{[Equation 25]}$$

If Equation 25 holds for all similar items configuring the likelihood, the maximum likelihood solution of a partial score is considered to appropriately match a solution of binary data.

In the explanation above, it has already been indicated that the partial test score model according to the present invention corresponds to a common binary item response model with the problem of the same parameter or so far as the definition of the iterations is the same in the similar parameters. However, in the current application, the iterations are not necessarily the same for all problems, that is, the number of steps of the partial score are not always the same in all problems. For example, in an achievement test, there are some easy items at the beginning portion which can be evaluated in binary, and there are some difficult items in the final portion which can be marked by multivalued evaluation. In the situation, it is necessary to expand Equation 9 as follows.

$$l_{part} = \sum_{j=1}^{n} s_j(r_j \ln(P_j(\theta)) + (1-r_j)\ln(Q_j(\theta))) \quad \text{[Equation 26]}$$

In the expanded partial test score model above, the maximum likelihood solution of a common binary model approximately matches the solution of Equation 26.

The evaluation of the iterations $s_j$ using the binomial distribution is described below. The expanded partial test score model represented by the following equation is applied, $$l_{part}(\theta) = \sum_{j=1}^{n} s_j(r_j \ln(P_j(\theta)) + (1-r_j)\ln(Q_j(\theta))) \quad \text{[Equation 27]}$$

the iterations $s_j$ of each item is normally unclear unless there is a simulation, and is to be estimated. The estimation of $s_j$ depends on the feature of the partial score as described below.

First, the case in which a partial score is an average value of a plurality of true-false problems. If the partial score of a problem j is an average value of a plurality of binary true-false problems comprising a set of questions, etc. (when the total score of the plurality of problems is used as a marking result), then the number of problems is the estimated value of the iterations $s_j$.

Second, the case in which a partial score is a stepwise evaluation of a questionnaire, etc. is considered. Using the rating scale often used in a common questionnaire, the iterations s can be estimated to be m when the number of steps is m+1. For example, if the items of questions are answered by the four step evaluation of "1. Certainly yes.", "2. Partly yes.", "3. Partly no.", and "4. Obviously no.", then, to process the answer result as partial scores of 0 to 1, each answer x is converted into (x−1)/3 so that the partial score data of the four steps "0, ⅓, ⅔, and 1" is analyzed. This is the same operation as dividing a sum of the scores of the three binary items by 3. That is, when the answer of the questionnaire is evaluated in m+1 steps, it is estimated that the iterations $s_j$ of the binary data is m.

Third, the case in which the partial score is not an average value of a plurality of binary true-false problems, but is a marking result such as the evaluation of a marker, etc., and the number of steps is relatively small is considered. The simplest estimating method of $s_j$ is to estimate that the iterations of binary data items is s if the original binary data r is a mark of s+1 steps. In the concept of a partial test score model, the result obtained by dividing the total of the binary data by the iterations corresponds to the partial score r. Therefore, for example, if the evaluation result of the marker is represented by the three steps of 0, 0.5, and 1, then it is equal to the operation of dividing a sum of the marks of two binary items by 2. It is obvious that equal intervals among the steps in which scores can be marked are required to hold the description above. Although there are equal three-step partial scores, the meaning of 0, 0.5, and 1 and that of 0, 0.75, and 1.0 are different. From the assumption that the partial score is marked from the iteration of the same parameter items, it is hard to consider that the latter pattern occurs by the iterations of 2, thereby requiring the assumption of a larger iterations. For example, a pattern of 0, 0.25, 0.5, 0.75, 1.0 is assumed, and the iterations of 4 is considered.

Fourth, the case in which the partial score is not an average value of a plurality of binary true-false problems, but a marking result such as the estimation of a marker, and the number of steps is large is considered. As described above, when the partial score r is m+1 steps, and it is necessary to configure it using binary true-false items, the iterations s is to be m. When there is a smaller number of steps, it is considered that the estimation described above is accepted. However, when there is a larger number of steps, there is the higher possibility that the problem can occur. For example, in a test based on a scale of 100, if a marker marks answers excluding one result based on a scale of 10, the number of steps is 11 steps, and the iterations is 100. However, when the marker scores 69 as the score of the answer result of one testee, the iterations is to be set to 101, or it is difficult to give partial scores. Furthermore, when real numbers are admitted in addition to integers, it is also difficult to estimate the iterations in the above-mentioned concept.

To solve the above-mentioned problems, the iterations are estimated after setting some assumptions. For the partial score of the problem j, it is assumed that a partial score is configured by a true-false average by the iterations of latent problems related to the corresponding problem, and the correct answer rate is Pj, and the wrong answer rate is Qj=1−Pj (assumption of a partial score). At this time, if θ is fixed, the probability $P_m(R=r|\theta)$ that the partial score R indicates $0, 1/m, 2/m, \ldots, 1$ matches the binomial distribution.

$$P_m(X=x|\theta) = {}_mC_x P_j^x Q_j^{m-x}, x=0, 1, \ldots, m \quad \text{[Equation 28]}$$

Then, in the entire parameter group, the probability that the partial score indicates r in the m iterations is calculated as follows.

$$P_m(R=r) = \int {}_m C_x P_j^x Q_j^{m-x} \phi(\theta) d\theta \quad \text{[Equation 29]}$$

The distribution function is calculated as follows.

$$F(r) = P(R=0) + P(R=1/m) + \ldots + P(R=r) \quad \text{[Equation 30]}$$

where $\phi(\theta)$ indicates the parameter group distribution. It is desired that the theoretical distribution matches the empirical distribution obtained from the data. Therefore, the matching level between the theoretical distribution and the empirical distribution is evaluated using the Kolmogorov-Smirnov test statistic.

$$KS \text{ value} = \max|F(r) - F'(r)| \quad \text{[Equation 31]}$$

where F(r) indicates the relative accumulation frequency of the distribution function up to the step r in the theoretical distribution, and F'(r) indicates the relative accumulation frequency up to the step r in the empirical distribution.

Actually, When the Kolmogorov-Smirnov test statistic is obtained, it is difficult to make a comparison using a discrete amount of the theoretical distribution and the empirical distribution, and the step values do not match between them. Therefore, according to the present invention, the comparison is made in the following method.

First, $\phi(\theta)$ is assumed to be a standard normal distribution. Any parameter group distribution can be used as necessary. Thus, by performing number integration, Equation 29 is obtained. As a result, Equation 30 is obtained. R indicates the number of m+1 steps of $0, 1/m, 2/m, \ldots, 1$. Assuming that R is latently a continuous amount, the frequency of the l-th step value l/m is a reflected frequency of R contained in the range [l/m−1/2m, l/m+1/2m]. Therefore, the empirical distribution function F' (l/m) to be compared with the theoretical distribution function F (l/m) up to the l-th step value of l/m is assumed to be the relative accumulation frequency of the range [0, l/m+1/2m] of the range [0, 1] as a partial score.

In the above-mentioned method, it is possible to set the number of steps m for obtaining the minimum Kolmogorov-Smirnov test statistic to the estimated value of the iterations $s_j$. The effectiveness of this method is confirmed by applying it to the following simulation and actual data.

Fifth, the study of the method of estimating the iterations $s_j$ using a simulation is described below. Assuming that the partial score partial score $r_j$ of the problem j is represented as a true-false average by the iterative presentation of a binary true-false problem, it is regenerated by the simulation, and the four types (5 to 40 binary problems are used to make partial score data of one problem) of iterations $s_j$, that is, $s_j$=5, 10, 20, and 40, are used, thereby generating the data for 40 problems and 3000 persons.

The method of estimating the above-mentioned iterations $s_j$ requires an item parameter. Therefore, based on the generated partial score data, an item parameter and an ability parameter are simultaneously estimated (the iterations $s_j$ at this step is 1).

FIG. 7a is a plot of 3 to 10 iterations of the maximum value (Kolmogorov-Smirnov test statistic) indicating the difference in distribution function between the estimated empirical distribution and theoretical distribution with the true s=5. The problem in this case is the condition that the iterations is large. Therefore, the iterations s=1, 2 are originally not required, and are omitted here (the iterations using binomial distribution are estimated at least from s=3). In FIG. 7a, it is obvious that the Kolmogorov-Smirnov test statistic indicates the minimum value with the true iterations of 5. FIG. 7b shows s=10, FIG. 7c shows s=20, and FIG. 7d shows s=40. In any case, the true iterations indicate the minimum values.

Sixth, as an example of applying the present invention to an achievement test, an example of estimating the iterations on the practical data is described below. An example of applying it to the estimation of the iterations $s_j$ in an English ability test is described. The test includes 43 items as the number of problems for the testees of 9480. Since they are presented as a long text interpretation problem with a plurality of questions, two sets of problems each containing five questions are prepared. Partial scores are generated with true-false average of the questions of the two sets, and the above-mentioned iterations are estimated. The resultants are shown in FIGS. 8a and 8b. In FIGS. 8a and 8b, the minimum values of the Kolmogorov-Smirnov test statistic are shown in the problems number 5 in each group, and the effectiveness of estimation is indicated.

Described above are the design of a computer adaptive test and a partial test score model for use in the processing system according to the present invention. The partial test score model is obtained by amending a binary item response model. Therefore, in the partial test score model, the number of parameters to be estimated is the same as in the case of the binary model. Unless specific interest is taken in the feature of a problem, it is not necessary to use a conventional complicated multivalued model when an achievement test is designed and its results are processed.

When a partial test score model used in the present invention is compared with a conventionally well-known graded response model, etc., the following is apparent. (1) In the Item Response Theory, data is normally to be binary and one-dimensional, but the partial test score model can be applied to multivalued and multi-dimensional data. (2) A partial test score model (as compared with a graded response model and other multivalued models) is simple and comprehensible by a user. (3) Since a partial test score model is (unlike a graded response model and other multivalued models) seamless with a widely used 2-parameter logistic model, a result can be easily interpreted, and can be conveniently used in analyzing data containing both binary and multivalued data. (4) A partial test score model includes a smaller number of parameters in a model as compared with (a graded response model and) other models, and therefore causes no problems in an estimating process. (5) A partial test score model can be applied in wider and various fields by converting an answer result into partial scores from 0 to 1. (6) A partial test score model can be easily applied not only to a test but also to questionnaire data. (7) A partial test score model can be easily applied in response to a change in marking result because the parameters in the model do not increase (as in the case of the graded response model and other models) although the number of steps of answers increases.

One (Fujimori) of the inventors of the present invention has performed a simulation using a partial test score model. According to the result, (1) the graded response model requires a bias in estimating the identifiability when a test includes a small number of items, but the partial test score model does not cause the phenomenon. (2) The order correlation between the score of the number of correct answers and the ability estimated value of the partial test score model is higher than that of the graded response model (The correlation with a true value is almost equal between the models).

Described above is the outline of the partial test score model used in the test system according to the present invention, and the gist is checked again as described below. In the partial test score model of the present invention, a total score is divided by a sum of the number of items to obtain input data as partial scores from 0 to 1. That is, the dummy variable for use in a true-false check of likelihood of a binary model is used as a practical variable indicating a partial score or a weight of a correct/wrong answer rate. Although a partial score is processed under the above-mentioned assumption, the consistency with the conventional binary process can be theoretically maintained, and the simulation result indicates that the estimation result using the likelihood function of the binary data is substantially equal to the estimation result using the likelihood function in the partial test score model.

Described below is the practical application of the above-mentioned partial test score model in the test system according to the present invention. A practical example can be an English ability test. For questions evaluated by binary correct-false marking for a closed-end question, etc. for example, the conventional Item Response Theory is applied, and the item parameter and the ability $\theta$ are estimated using the likelihood function $L_B$ of Equation 4. On the other hand, in the problem of writing (composition) and speaking (conversation), the ability in English of a testee can be more analytically and precisely evaluated by allowing partial scores, not by the binary marking of correct-false determination. In this case, the conventional Item Response Theory based on the binary evaluation cannot be applied, and the above-mentioned partial test score model is used.

In the partial test score model, for example, when an answer of a testee of a composition problem is to be scored, a partial score of a scale of 25% from zero (0) to perfect (1) can be given. Practically, in Equation 5, the partial score is processed with the likelihood function allowing partial score $r_{ij}$ of possible five values of 0, 0.25, 0.50, 0.75, and 1. The item parameter a (identifiability) and b (difficulty level) contained in Equation 3 for definition of P have already been estimated using the data in the pretest conducted in advance using the same problems. As described above in the general descriptions, in the partial test score model of the present invention, it is assumed that a partial score is represented as a true-false average when a problem having the same parameter is iteratively presented. Therefore, in one item (=problem), equal values of the item parameter a and b are used for any partial score.

As a practical example, assume that three problems of the English composition are presented, and the answers of a testee are evaluated as 0.25, 0.75, and 0.50. In this case, since the answers are evaluated using 5 step partial scores including 0 and 1, the iterations are 4, and the logarithmic likelihood of the likelihood function $L_{part}$ is taken into account, and the partial scores 0.25, 0.75, and 0.50 are assigned to the partial score $r_j$ of Equation 9.

$$l_{part}(\theta) = \sum_{j=1}^{n} s_j(r_j \ln(P_j(\theta)) + (1 - r_j)\ln(Q_j(\theta))) =$$ [Equation 32]

$$4[\{(0.25)\ln P_1(\theta) + (0.75)\ln Q_1(\theta)\} +$$
$$\{(0.75)\ln P_2(\theta) + (0.25)\ln Q_2(\theta)\} +$$
$$\{(0.50)\ln P_3(\theta) + (0.50)\ln Q_3(\theta)\}]$$

where the item parameters a and b contained in the logistic curve P are estimated in advance for each problem. Using the logarithmic likelihood of Equation 32, and in the maximum likelihood and the Bayes' Theorem, the ability θ of the testee is estimated. These methods are the statistical techniques which have conventionally been well-known, and are not the features of the present invention. However, in any estimating method, a necessary logarithmic likelihood is obtained only by a partial test score model which is the core of the present invention.

Described above is the basic application example of a partial test score model. Using the partial test score model, unlike the simple example, the precision in evaluating the ability of a testee can be enhanced by providing a plurality of evaluation standards, and adopting an analytical evaluating method of evaluating one problem from various viewpoints. For example, there can be the case in which the difference in ability of a testee which is not manifest in the above-mentioned basic application example can be clearly indicated. For example, in a writing problem, five evaluation standards are set for evaluation of high precision. They are: (a) goal achievement, (b) grammar, (c) vocabulary, (d) style, and (e) mechanics. In a speaking problem, in addition to (a) to (c) above, (f) fluency and (g) pronunciation are the evaluation items to be set. The reason for setting the evaluation items is, for example, in a composition problem, various evaluation viewpoints can be reflected by regarding a problem formed by a plurality of small questions in evaluating one composition of sentence by checking the points of: poor writing but the intention of a writer possibly communicated to a reader; no error in grammar, but unnatural and not recommendable representation; containing an apparent grammatical error; containing misspelling in words, misuse of a similar word; incomplete as a sentence; wrong punctuation, etc. By setting the above-mentioned plural evaluation items and regarding one problem as a combination of a plurality of smaller problems, a higher precision evaluation can be performed than in the above-mentioned basic application.

When the above-mentioned evaluation item are set, the following evaluation can be performed. Relating to the presence/absence of the purpose described in (1) above, for example, the purpose of "transmitting an intention to request the partner to arrange a hotel reservation" is set in each problem, and the set purpose is checked in binary (1 or 0) of "attained, or not attained". Relating to other evaluation items, the partial score is allowed by 25% scales from 0 to 1. That is, five values, that is, 0, 0.25, 0.5, 0.75, and 1, are assigned to partial score $r_{ij}$ of Equation 5. As in the above-mentioned basic application example, the item parameter a (identifiability) and b (difficulty level) contained in Equation 3 defining the logistic curve P contained in the likelihood function are estimated in advance-using the data in the pretest performed using the same problems before the formal test. Using the above-mentioned marking method, a single English composition test of a conversation test can be presented with various viewpoints of evaluation. However, the above listed evaluation items are only examples, and any other viewpoints can be applied in evaluation in the test system according to the present invention.

The process of applying the Item Response Theory including the partial test score model to the English ability test and estimating the ability of a testee is described above. The present invention is a test system and a testing method for realizing the evaluation of the ability by the Item Response Theory including the above-mentioned partial test score model using a common personal computer in the Internet connection environment. The outline of the operation of the test system according to the present invention is described below by referring to the attached drawings.

FIG. 1 shows the outline of the first embodiment of the test system according to the present invention. A testee has a rest using a testee unit 101 which is a personal computer in the Internet connection environment mounted in a language school, etc. in which a test (for example, an English ability test) designed, enforced, and processed by the system according to the present invention is conducted. If the authentication of a testee can be appropriately performed, the test can be conducted at home. The answer result input to the testee unit 101 which is the personal computer through a keyboard, a mouse, a microphone, etc. by a testee is transmitted to a marker unit 102 through a network 103 such as the Internet, and a marker whose mother tongue is English which is the target language of the test marks the answer of the testee while allowing the partial scores. At this time, the evaluation items of the partial scores are not changed depending on the difficulty level of a problem. However, the answer result is not transmitted from the testee unit 101 directly to the marker unit 102, but is temporarily transmitted to a test management server 104 for centrally managing the test, and then normally transmitted to one of the appropriate marker units 102. The test management server 104 comprises a problem database 105. The problem database 105 stores a problem group which is performed in a pretest and for which item parameters (identifiability a and difficulty level b in Equation 3) are estimated in advance. The test management server 104 selects a problem group from the problem database 105 when a testee is specified, and transmits the selected program group to the testee unit 101.

Figure 2:
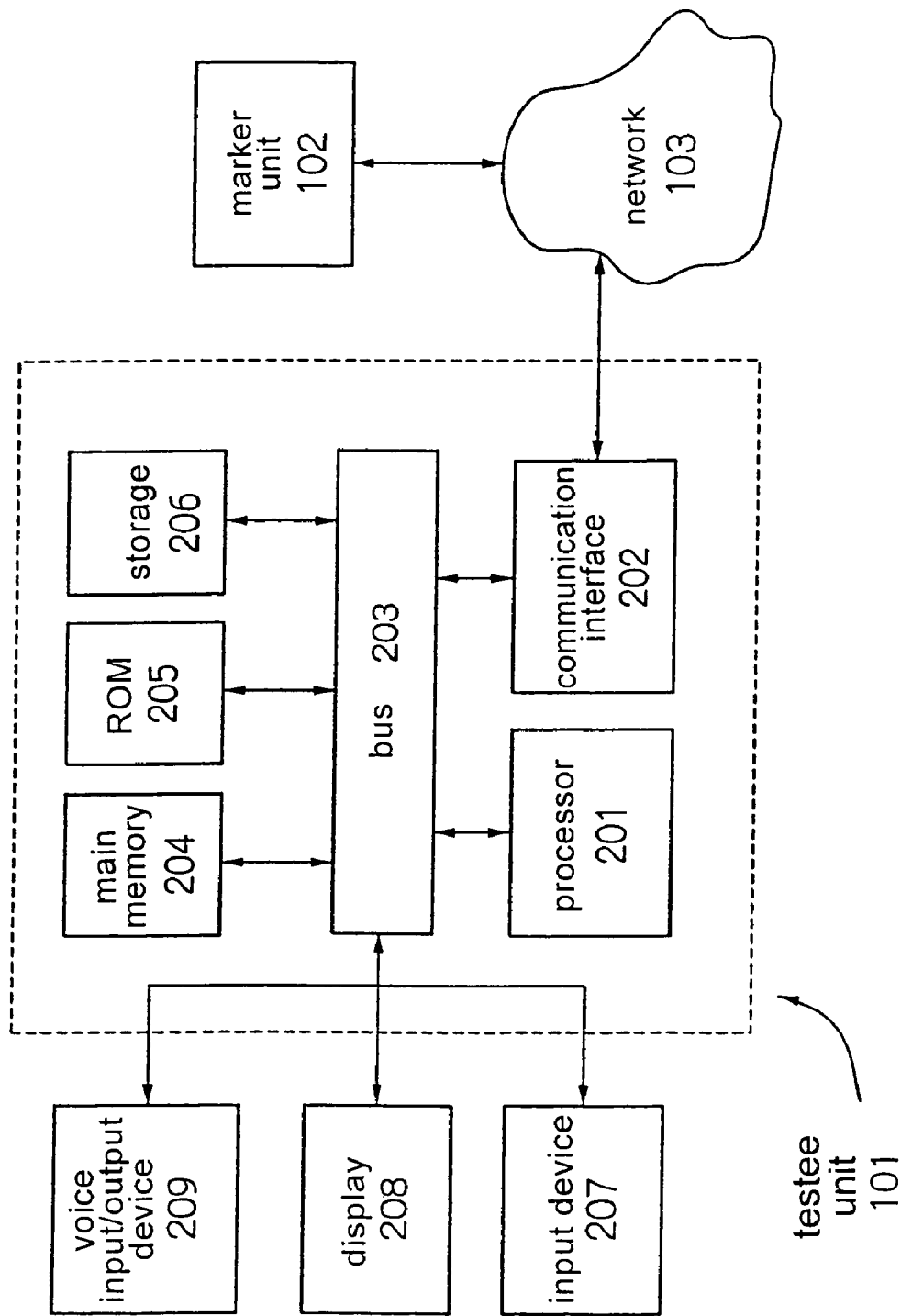
FIG. 2 shows the outline of the testee unit configuring the test system according to the present invention.

FIG. 2 shows the outline of the testee unit 101. The testee unit 101 normally is a common personal computer having the Internet connection environment. An input device 207 is a mechanical input device such as a keyboard, a mouse, a touch panel, etc., and a voice input/output device 209 is a microphone, a speaker, etc. A testee first inputs the ID of the testee manually through the input device 207 or through the voice input/output device 209 by voice, and instructs the start of the test. The ID of the testee is uniquely issued to each testee from the test management server 104 when the testee makes an entry of the test. Normally, to manage the security, an ID and a password are simultaneously issued. Using a uniquely issued ID, the frequency of a testee having the test is recognized by the test management server 104, and appropriate problems are presented. In response to the instruction, the problems are transmitted from the test management server 104, and displayed on a display 208, or selected depending on the level of the testee and output from the voice input/output device 209 including a speaker, and the testee inputs an answer through the input device 207 or the microphone (voice input/output device 209). An answer to the question of writing and speaking requiring the partial scores is transmitted to the marker unit 102 through a communications interface 202 and the network 103 such as the Internet, etc. As described above, the answer is not transmitted from the testee unit 101 directly to the marker unit 102 for marking in real time, but is temporarily transmitted to the test management server 104, and then transmitted to one of the appropriate marker units 102. It is natural from the viewpoint of efficient marking operation that a predetermined number of answers are collected and market collectively.

Figure 3:
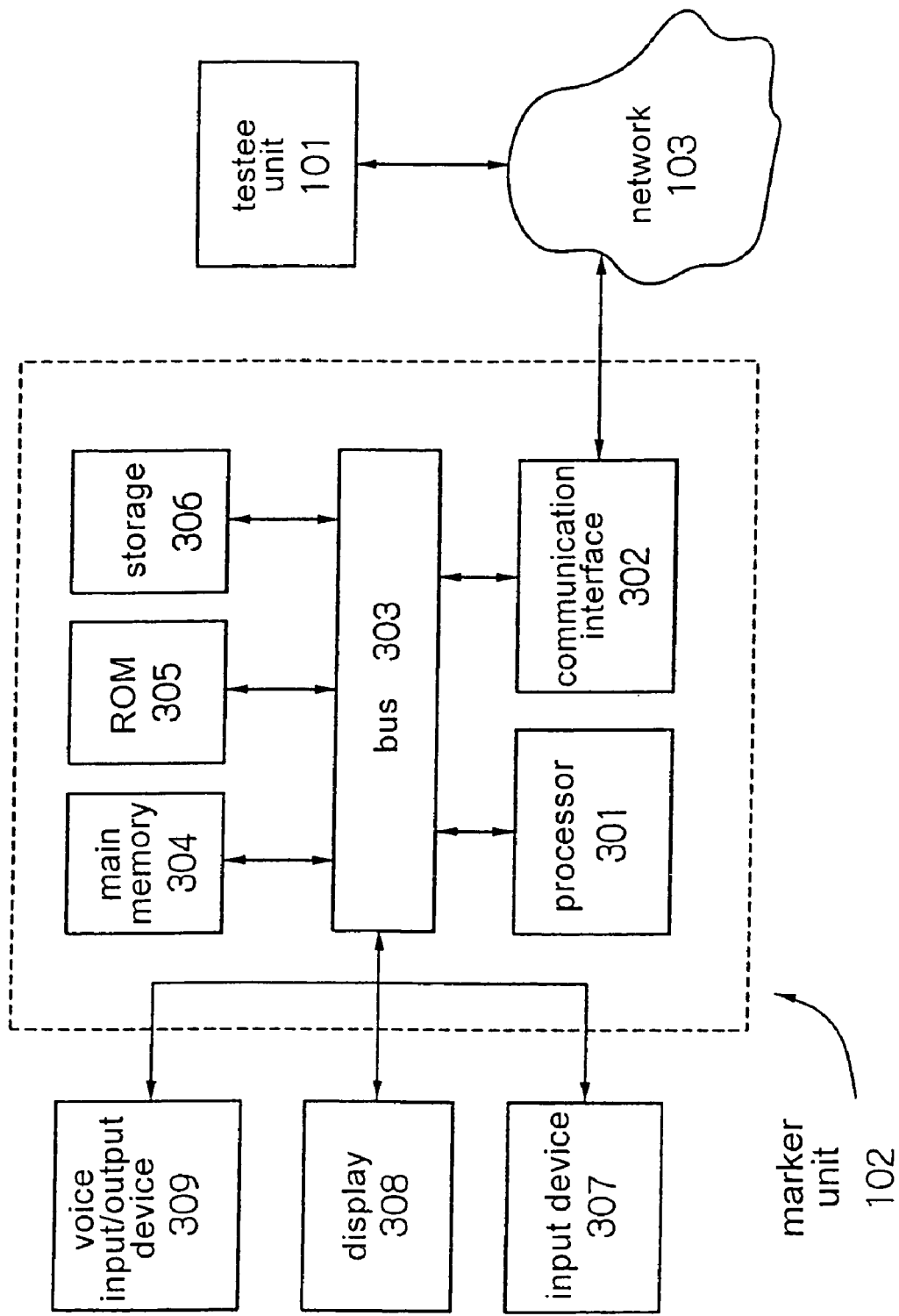
FIG. 3 shows the outline of the marker unit configuring the test system according to the present invention.

FIG. 3 shows the outline of the marker unit 102. The marker unit 102 is a common personal computer having an Internet connection environment as with the testee unit 101. Through the network 103 such as the Internet, etc., the answer results transmitted from the testee unit 101 or the test management server 104 through the network 103 such as the Internet, etc. are displayed on a display 308, or output from a speaker (voice input/output device 309), and marked using an input device 407 such as a keyboard, a mouse, etc. The marking result is returned to the test management server 104 through the network 103 such as the Internet, etc.

In the first embodiment of realizing the test system of the present invention as described above, a testee unit, a marker unit, and a test management server are included as communications terminals of the communications network using a communications circuit such as the Internet, etc. However, although it is clear to one skilled in the art, the test system of the present invention can also be realized using a stand-alone personal computer not having communications capability. In this case, the database storing a number of problems for which the difficulty level and the identifiability are estimates in advance is provided in the storage device such as the hard disk, etc. of the personal computer, and the testee answers a problem of writing and speaking presented at an instruction contained in the program for executing a test of the present invention presented in an aspect stored in a CD, a DVD, etc. through a keyboard and a microphone. The answer result is temporarily stored in a hard disk, etc., and the marker reads the answer result from the hard disk, and marks the answer using partial scores. The method of processing a partial score in the case of the second embodiment of the present invention is similar to the first embodiment. When the marking operation is completed, the ability of the testee is evaluated using the language test based on the partial test score model.

Figure 4:
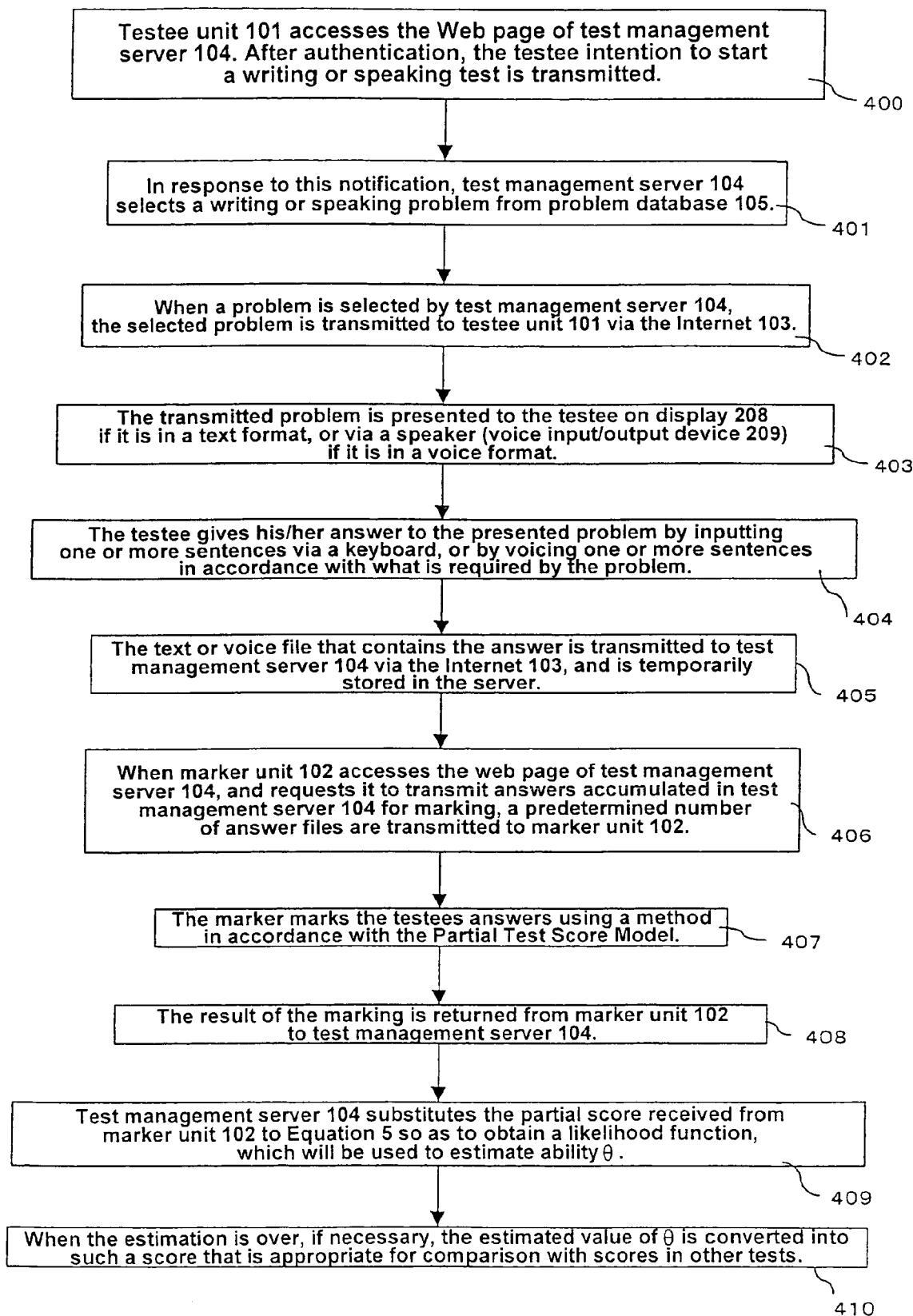
FIG. 4 is a flowchart showing the outline of conducting a test using the system according to the present invention, and especially shows the process of testing and marking writing and speaking problems relating to the partial score on which the present invention is based.

FIG. 4 is a flowchart showing the outline of a test conducted using the test system according to the present invention. As in the first embodiment, the execution and the process of the test of writing and speaking on which the partial test score model is based are shown. In a problem of writing, a testee normally gives his/her answer to the problem by typing English sentences via a keyboard (the input device 207 shown in FIG. 2). In a program of speaking, a testee uses a microphone (voice input/output device 309 shown in FIG. 3) provided for the personal computer, and inputs an answer in response to a presented question or by voice, and the contents of the utterance is processed as a target to be evaluated. The marker enters a standby state at the marker unit which is another terminal connected to the personal computer over the network such as the Internet for marking in real time, but actually, the answer of the testee is temporarily stored in the test management server, transmitted to the marker unit, and collectively marked as a group of a number of answers.

First, in the testee unit 101, the testee accesses a specified Web page on the Internet. On the Web page, the testee inputs his/her ID and password for authentication. Then, his/her intention of starting a writing or speaking test is transmitted by clicking a predetermined button (step 400). In response to the notification, the test management server 104 selects a writing or a speaking problem from the problem database 105 (step 401). When it is selected, the problem containing the English compositions having the optimum identifiability and the difficulty level can be selected in relation to the ability θ estimated based on the marking result of the answer of the testee to the closed-end question. For example, when a writing problem is selected, the answer result to the reading problem is referred to. When a speaking problem is selected, an answer result to the listening problem can be referred to. It is because the ability of writing relates to the ability of reading, and the ability of speaking relates to the ability of listening. However, the program selection is only an example, and it is not the essential portion of the test system based on the Item Response Theory including the partial test score model according to the present invention.

The item parameter contained in the logistic curve corresponding to the selected problem is normally determined for each evaluation item. However, it is also theoretically possible to simultaneously make the maximum likelihood for estimating an ability parameter and estimating an item parameter. In the test system of the present invention, the possibility of the simultaneous maximum likelihood is not rejected. In this case, the item parameter of the problem stored in the problem database 105 may be already estimated or may not. The estimation of the item parameter is performed based on the partial test score model used in the likelihood function of Equation 5 as in the case of estimating the ability θ. Furthermore, when the item parameter is estimated, the process referred to as equalization for standardization of the identifiability and difficulty level is also performed. By the process of equalization, absolute evaluation regardless of the parameter group of a testee can be performed. However, the equalization is consistent with the Item Response Theory, and is not the feature of the present invention.

When a problem to be presented is selected by the test management server 104, the selected problem is transmitted to the testee unit 101 (step 402) through the network 103 such as the Internet, etc. The transmitted problem is presented on the display 208 if it is in a text format, and through a speaker (voice input/output device 209) if it is in a voice format (step 403). A testee types the sentence in inputting the presented problem, or returns an answer in the uttered voice format (step 404). The document or the voice file forming an answer is transmitted to the test management server 104 through the network 103 such as the Internet, etc., and temporarily stored therein (step 405).

The above-mentioned process is repeatedly assigned to a predetermined number of testees, and a predetermined answer files are stored in the test management server 104. The problems presented to the plurality of testees are not always fixed because, from the common concept of the Item Response Theory, the ability θ can be appropriately estimated although the presented problems are different. When the marker unit 102 accesses the Web page opened by the test management server 104, and when a request to transmit an answer accumulated in the test management server 104 for marking, a predetermined number of answer files are transmitted to the marker unit 102 (step 406). The marker marks the answer in the method of allowing partial score described above (step 407), and returns the marking result to the test management server 104 (step 408). However, normally, whether a plurality of answers are collectively marked or marked in real time is determined regardless of the feature of the present invention.

Then, the test management server 104 substitutes the partial score received from the marker unit 102 for the likelihood function of Equation 5, and estimates the ability θ (step 409). As described above, the item parameters can be simultaneously estimated. The estimating method can be the maximum likelihood, the Bayes' Theorem, etc. When the estimation is over, and if it is necessary, the estimated value of θ is converted into a score for comparison with other tests (step 410).

By performing the above-mentioned processes using the according to the present invention, the test including a problem which is marked with the partial score taken into account, which has been difficult in the common Item Response Theory, can be operated in estimating the ability using the conventional Item Response Theory.

The inventors made a research to confirm the stability of the score in cooperation with twelve testees on May 21 to 28, 2003 to confirm the effectiveness of the estimation of the ability using the test system according to the present invention. The same testee continuously has an English ability test successively three times using the test system according to the present invention to check whether or not there is a large difference in test scores. The English ability test used in the research is formed by listening, reading, writing, and speaking technical tests.

The testees are twelve university students living in Tokyo and relatively good at English. If the English ability evaluation by the test system according to the present invention is appropriate and the estimation of an item parameter of each problem including the equalization is appropriately performed in the test system according to the present invention, then it is assumed that the resultant test scores obtained by the same testee three times on the same day do not indicate large differences because it is considered that the English ability of a person does not largely change in a day.

Figure 6:
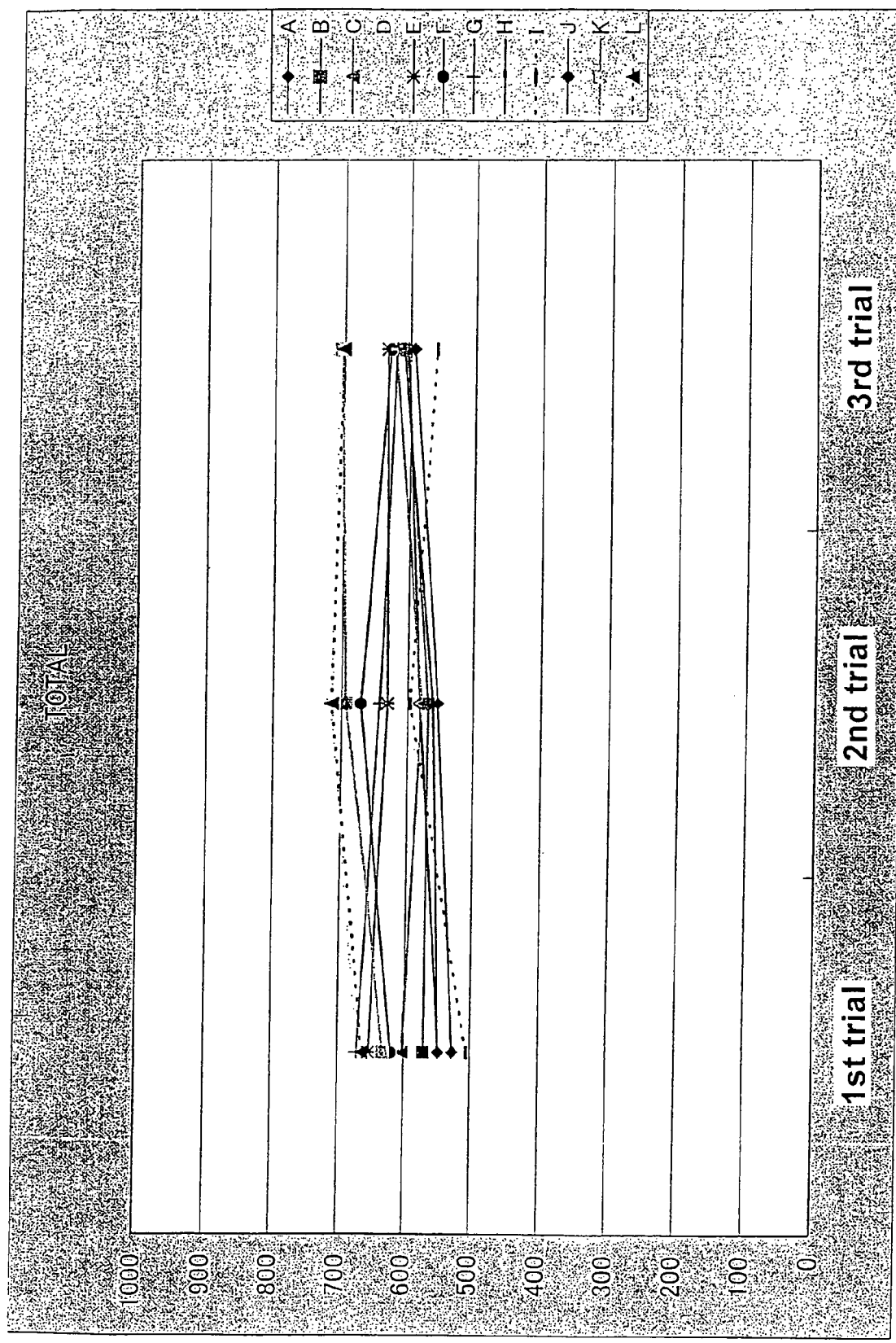
FIGS. 6a to 6g are graphs each showing the scores of 12 testees in the score stability confirmation check shown in FIG. 5.
Figure 6:
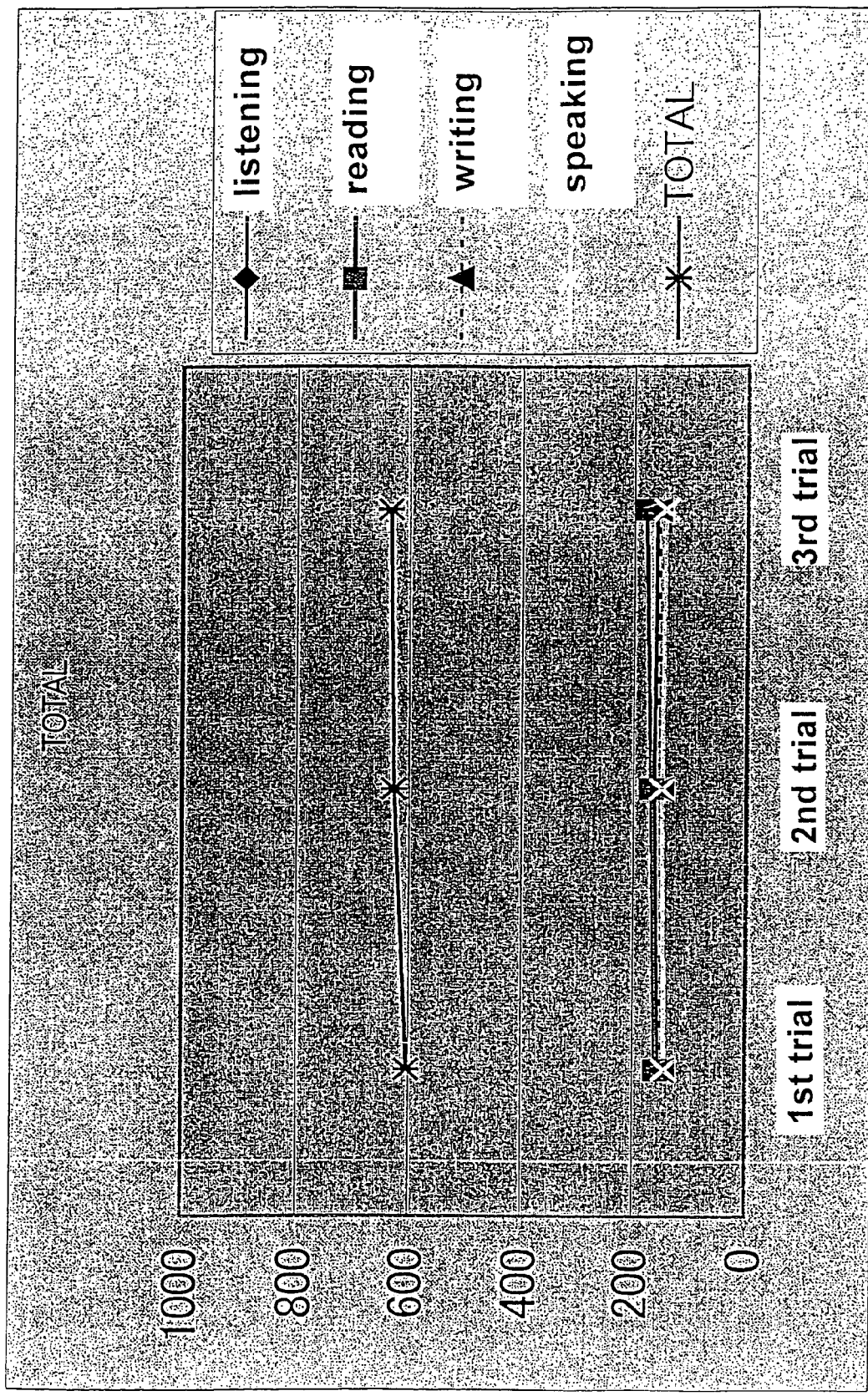
Figure 6:
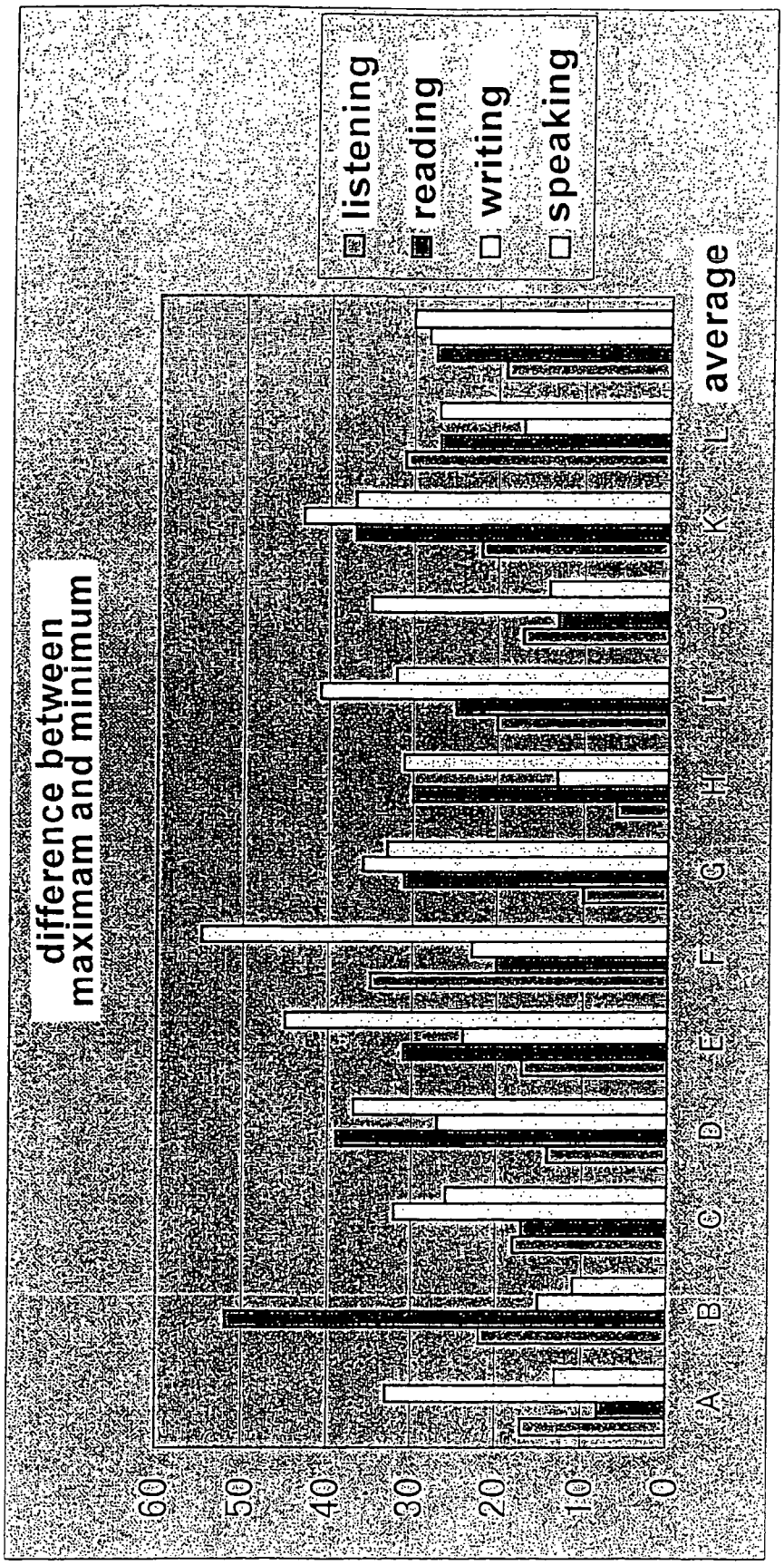
Figure 6:
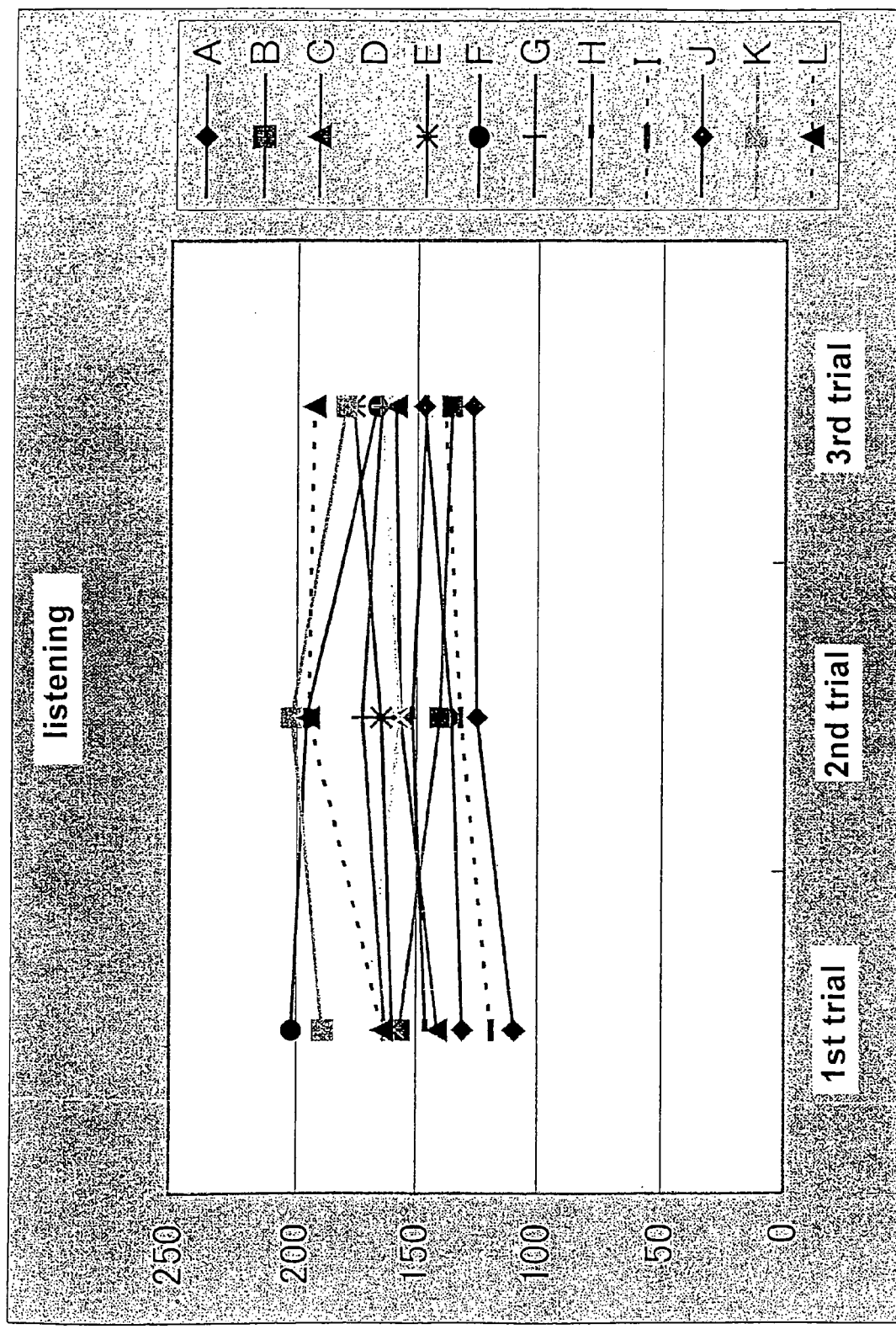
Figure 6:
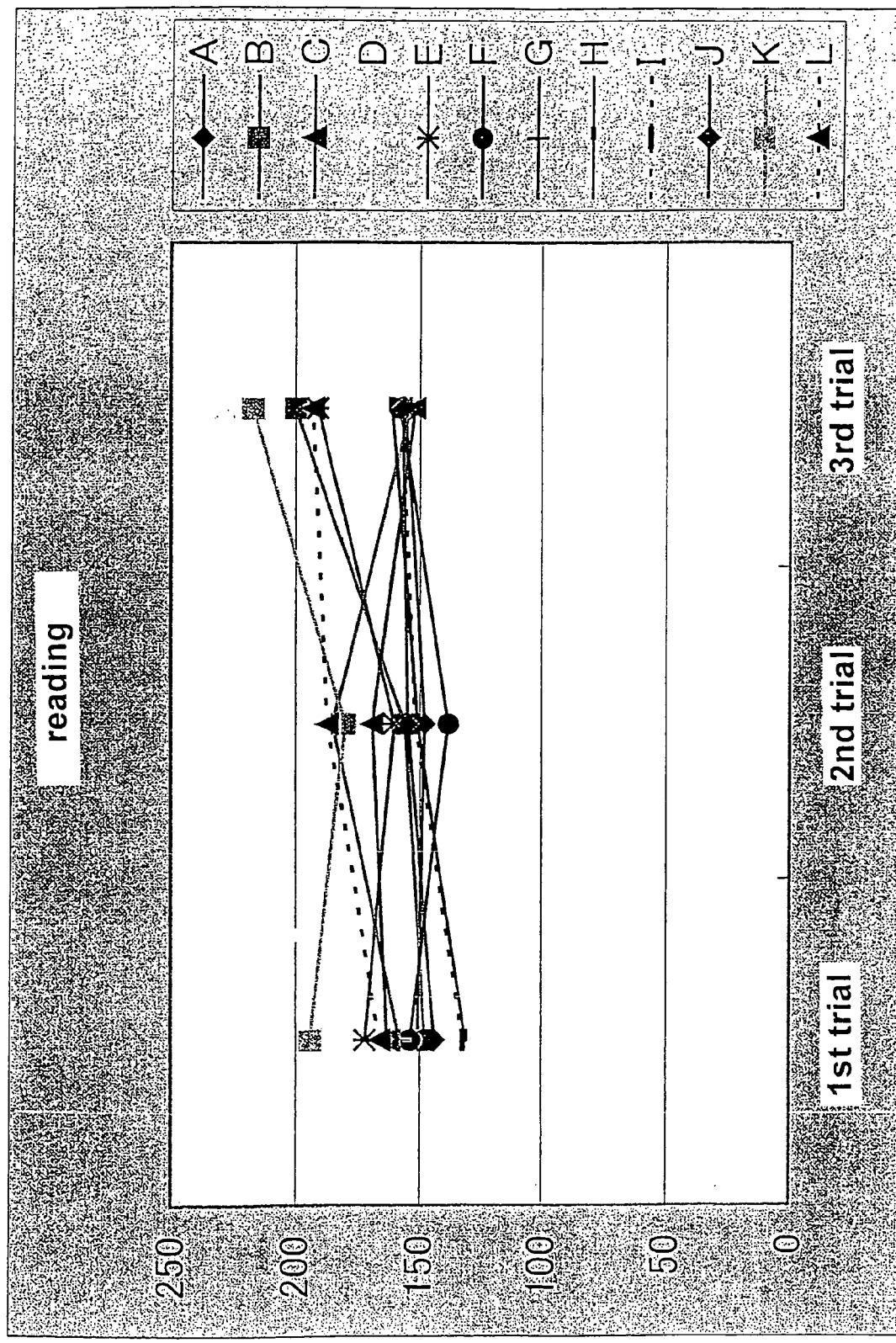
Figure 6:
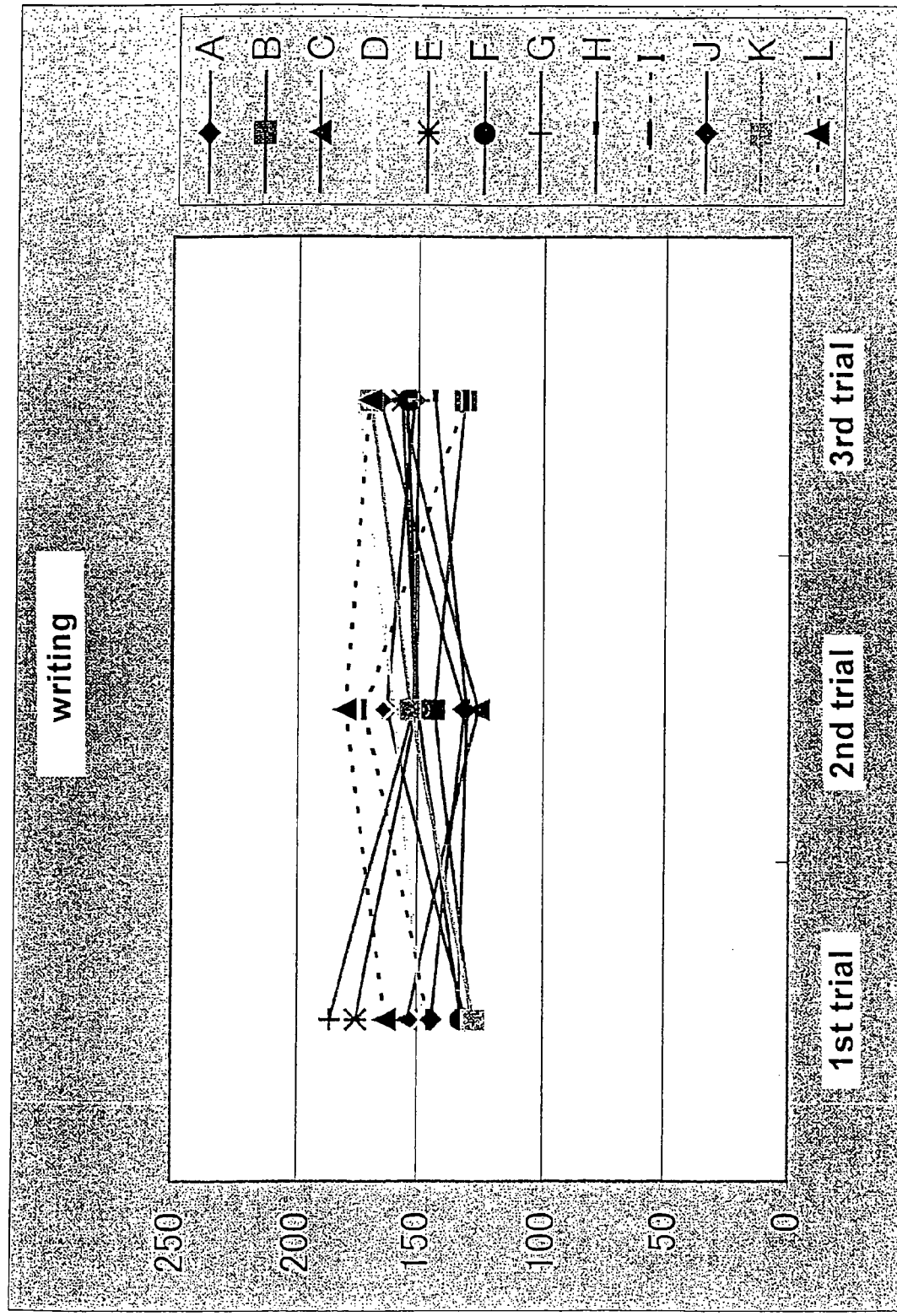
Figure 6:
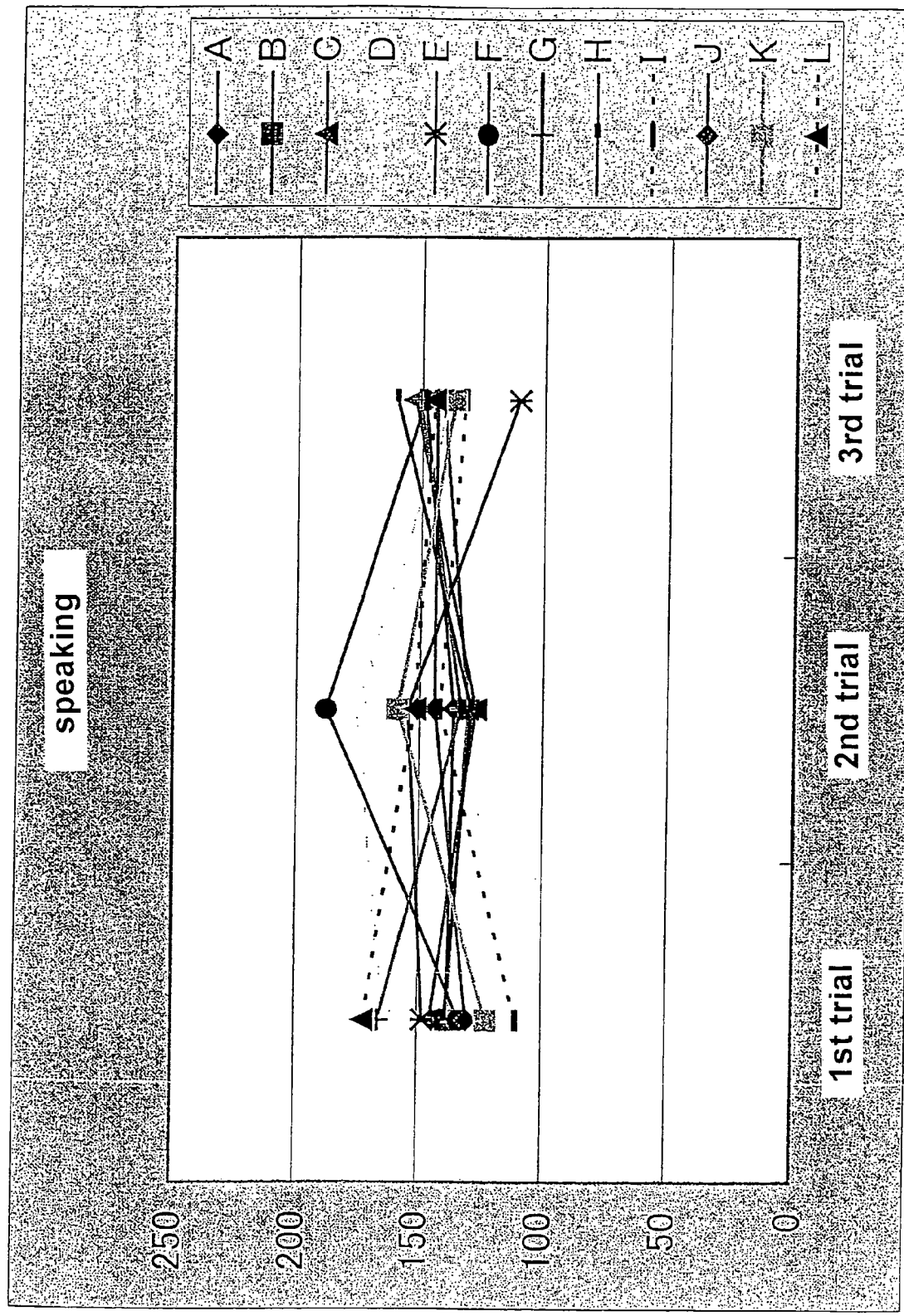

The details of the results are shown in FIG. 5 as a graph. FIG. 6 shows the average scores of the twelve students. Although there are differences among the testees, the improvement in scores is detected in the second result as compared with the first result due to the learning of the format of the tests (normally referred to as a "rehearsal effect"), and the reduction due to fatigue (especially apparently in the result of the speaking test in the last problem at the last stage) is detected in the third result as shown in FIGS. 5 and 6.

However, average scores indicate the variance of 5.4 to 18.5 points (=2.2% to 7.4%) based on a scale of 250 in each technical test, and total scores indicate only 3% variance. Therefore, in the test system according to the present invention, the variance in the resultant test scores is small, the standardization of scores is appropriately performed, and the absolute estimation regardless of the ability level of a parameter group can be successfully realized.

Assuming that the partial score is represented as a true-false average when a plurality of items having the same parameter are iteratively presented, partial score $r_j$ in Equation 5 is theoretically assumed to be a substantial variable, and the partial score from 0 to 1 are allowed, the evaluation results match with the case of the likelihood function used in binary evaluation in the conventional Item Response Theory, which has been the suggestion using the partial test score model on which the test system of the present invention is based. The research results shown in FIGS. 5 and 6 empirically indicate the theoretical conclusion.

Therefore, the test system of the present invention can attain the estimation of the ability with higher precision than the conventional technology with the consistence with the conventional Item Response Theory maintained. This is an outstanding effect of the present invention.

Finally, the thesis on the comparison between the graded response model and the partial test score model by one (Fujimori) of the inventors of the present invention ("Analysis of Multivalued Data in the Item Response Theory—Graded Response Model and Partial Test Score Model—") is referred to below excluding the figures and tables shown in the entire document. The thesis had not been disclosed when Japanese Patent Application No. 2002-279513 which is the Japanese Patent Application as the base of the priority in the application was filed on Sep. 25, 2002. Afterwards, it was published in "Study of Human Science" vol. 24 which is issued by the Human Science Department of Bunkyo University (2002). The thesis also refers to a wider application, not limited to an achievement test, and the terms not used in the present invention such as "item" instead of "problem", the term "tested person" instead of "testee", etc. are included.

1. Purpose of the Study

In the common Item Response Theory such as the 2-parameter logistic model (Birnmaum, 1968), only binary data such s a correct answer and a wrong answer can be processed, and no multivalued data can be analyzed. However, in the common psychological study, multivalued data is often used in the questionnaire data. Also in the Item Response Theory, it is not true that multivalued data cannot be used at all, but some analytical model has been developed. For example, a graded response model of Samejima (1969), a rating scale model (Andrich, 1978), and a partial credit model (Masters, 1982) are the typical models. However, as a practical problem, no sufficient software environments have been developed for the analysis of these models. Therefore, it is not stated that these models have been widely used.

In the situation, the present study compares the partial test score model of Fujimori (2001) with the graded response model based on a simulation and the analytical result of questionnaire data, and the method of analyzing the multivalued data is studied using the Item Response Theory.

Although the Item Response Theory is applied to multivalued data, it is necessary to know what model is recommendable. Therefore, (1) theoretical study, reproducibility of model parameter, study of the influence of the distribution of ability parameter, (2) study based on simulation for the studies above, the applicability to actual data, and (3) study based on demonstration data are required. In this study, (1) is described in 1.3, (2) is described in 2. and (3) is described in 3.

1.1. Graded Response Model

The graded response model of Samejima (1969) for allowing a graded response having the order of m is described first. In this explanation, only one item of a test is considered. Assuming that the dummy variable depending on each step of the answer of a testee is defined as u, a dummy variable indicating 0 when a response is made to a step lower than a given step, and indicating 1 in other cases is defined as x. When the probability of x=1 at which the testee having the ability θ is represented by the following Equation 33, Equations 34 and 35 are the graded response models.

$$P_u^*(\theta) = P(X=1|\theta) \quad \text{[Equation 33]}$$

$$P_u(\theta) = P_u^*(\theta) - P_{u+1}^*(\theta) \quad \text{[Equation 34]}$$

$$P_u(\theta) > 0 \quad \text{[Equation 35]}$$

where $$P_0^*(\theta) = 1 \quad \text{[Equation 36]}$$

$$P_m^*(\theta) = 0 \quad \text{[Equation 37]}$$

Equation 33 shows a boundary response curve for determination of the intervals of the steps, and Equation 34 shows a graded response curve representing the response probability of the steps. So far as the above-mentioned conditions are satisfied, the function of Equation 33 can be arbitrarily defined, but a normally used 2-parameter logistic model represented by Equation 38 is assumed in the present study.

$$P_u^*(\theta) = \frac{1}{1 + \exp(-a(\theta - b_u))} \quad u = 1, \ldots, m-1 \quad \text{[Equation 38]}$$

For the conditions of Equation 35, a is referred to as the identifiability, and is a parameter common to all curves in Equation 38. $b_u$ is referred to as a difficulty level, and is a parameter relating to the threshold of each step. That is, in the graded response model, the identifiability is assigned to each item and m−1 difficulty level parameter is assigned to the threshold of each step.

1.2. Partial Test Score Model

In the partial test score model, the logarithmic likelihood for the parameter estimation is represented by the following Equation 39 when the partial score is r (0 to 1).

$$l = \sum_{i=1}^{N} \sum_{j=1}^{n} s_j \{r_{ij} \ln(P_j(\theta)) + (1 - r_{ij}) \ln(Q_{ij}(\theta))\} \quad \text{[Equation 39]}$$

where i indicates a testee, θ indicates a parameter indicating the feature value of the testee, j indicates an item, s indicates the iterations of binary item conversion, p indicates a 2-parameter logistic model, and Q=1−p.

That is, the partial test score model is based on the 2-parameter logistic model. Furthermore, the item having the same or similar item parameter is assumed to be latently and iteratively performed on the testee. At this time, r can be a true-false average of iterative operations. It is proved that the maximum likelihood solution of the partial test score model and the 2-parameter logistic model for the iterative operations match (approximate for similar parameter) (Fujimori, 2002a).

1.3. Theoretical Study

The feature of the partial test score model is listed below (Fujimori, 2002b). (1) The item parameters are identifiability and the difficulty level, and can be easily understood by common users. (2) The number of model parameters is smaller than that of the multivalued model, and causes no problems in estimation. (3) Any answer/answer result can be converted into the partial score of 0 to 1, thereby being applied to various fields. (4) Easily applied to the rating scale of questionnaires. (5) Since the number of parameters does not increase although the number of steps of answers increases, the change of marking result and small amendments can be easily accepted. (6) Since it is seamless with the 2-parameter logistic model, the interpretation of the identifiability and the difficulty level can be performed as with the 2-parameter logistic model. Therefore, the operation of the combination use of binary and multivalued data can be conveniently performed. (7) When there are a set of problems each comprising binary items for partial scores for testlet/problem set, etc., a problem set can be operated as a partial score item, thereby decreasing the number of parameters on the entire test. (8) A model can be reapplied to the residual score, and can be applied to multidimensional data.

Although (7) and (8) are not described in this study, they are also important features of the model.

Then the feature of the graded response model can be described below. (1) It is outstanding as a model corresponding to the multivalued data in the Item Response Theory. (2) 30 years have passed since it was published, and some applications have been reported (for example, Noguchi (1999), etc.) (3) There is a published analytical software MULTILOG. (4) Since each graded response curve can be obtained, it is convenient when interest is taken in the response to each step. For example, using the parameter of the boundary response curve, it can be predicted at which level the response on θ for each step occurs.

When the models are compared, the difference in concept between the models is apparent. Since the graded response model has a larger number of parameters, data can be easily applied as compared with the partial test score model. It is also true that if the number of parameters is larger, the possibility of the problem of requiring a larger amount of data is high. On the other hand, since the partial test score model is simpler, the application is lower, but the stability of an estimated value is reserved. Relating to this point, the viewpoint of the information among standard AIC may be required in evaluation.

Relating to the point of the graded response model described in (4) above, it is difficult with the partial test score model. If the operation is required, the distribution of a testee is generated for each step. Although the item parameter is given, an appropriate assumption is made on the ability distribution of a testee, and a simulation is made to generate the distribution of a testee for each step. In any case, a laborious operation is required than for the graded response model.

While the above-mentioned merits are obtained with the graded response model (and with most suggested multivalued models) it has the problem of less flexibility in change of steps with the model parameter provided for each step. For example, if an item based on a scale of 20 in an achievement test is estimated by a teacher as 0, 5, 10, 15, and 20 indicating a rough 5 step evaluation, it is a 5-step graded response model. If an answer including misspelling and missing characters is decremented by one, there arises the problem that not only the value of the parameters of a model, but also the number of parameters also changes. If the item evaluated in 5 steps in the questionnaire is changed into 4 steps, the graded response model cannot use the item parameter as is.

As described above, the models have merits and demerits, but when much interest is not taken in each step, and only the entire feature of the item and the evaluation of the ability parameter are interesting, the partial test score model is a sufficient model.

2. Study Using a Simulation

It is not possible to exactly know through an actual test and questionnaire how an answer is generated. It is hard to determine at present which is closer to the current point, the partial test score model of the graded response model. Therefore, although the models are compared using a simulation, it is hard to determine through which model data is to be generated. When data is generated based on a certain model, and an analysis is made based on another model, it cannot be expected that a better result can be obtained, and no successful comparison can be made. Therefore, in this study, two simulations are made based on the partial test score model and the graded response model respectively. Each model analyzes the data of its own model and the data of the other model. It is also possible other mechanism than these two can be used, but fair comparison can be made based on these two models. That is, when data is based on the models, the reproducibility can be checked by the simulation, and when data is not based on the models, the toughness of the model can be evaluated.

2.1. Simulation Data Based on the Partial Test Score Model

The simulation data based on the partial test score model is generated as described below. First, 2-parameter logistic model is assumed as a component of a partial test score model. The distribution type of the 2-parameter logistic model is defined as follows. The parameter of identifiability is average 0.65, standard deviation 0.25, lower limit 0.3, and upper limit 2.0 in the disconnected normal distribution. The difficulty level parameter is based on the normal distribution of average 0, standard deviation 0.5. It is assumed that the ability parameter $\theta$ is based on the normal distribution of zero average and 1.0 standard deviation. Assume that the ability $\theta$ is generated based on the standard normal distribution, the correct answer rate predicted from the 2-parameter logistic model is compared with the uniform random number between 0 to 1, and the response of the testee has a correct answer of 1 when the former value is smaller, and a wrong answer of 0 when it is larger. The binary data pattern based on the 2-parameter logistic model is iteratively generated 10 times with the number of testees of 500, and the number of items of 200 (data 1 to 10). The same parameter is used for every 5 items. Then, an average value of the true-false sum of 5 items of the same parameter of the data is obtained to set the partial score data of five steps of 0, 0.2, 0.4, 0.6, 0.8 and 1.0. That is, the partial score data is 500 as with the binary data for the number of testees, but 40 for the number of items. Similarly, the ability $\theta$ of new testee with the given item parameter is added for 500 testees, thereby generating the data for the cross-validation data.

2.2. Simulation Data Based on the Graded Response Model

The data based on the graded response model is generated as described below. The graded response model is also based on the 2-parameter logistic model as a component. The distribution of the parameter is the same as that described above. The number of steps of the data is 5 from 1 to 5. Therefore, there are to be four boundary response curves among the steps from the model. To determine the curve groups, one identifiability parameter is generated based on the distribution as the common identifiability for each boundary response curve. Then four difficulty level parameters are generated. The smallest is selected to be used as the difficulty level of the boundary response curve at steps 1 and 2. Similarly, data is sequentially obtained from the smallest in difficulty level, and the difficulty level of the boundary response curve is determined. The difference among the boundary response curves is obtained to generate each graded response curve. One ability parameter $\theta$ is generated based on the standard normal distribution, the obtained value is fixed, and it is assumed that the response has occurred when uniform random numbers of 0 to 1 are entered in the area (the sum of the sizes of all graded response curve is 1 when $\theta$ is fixed) of the response probability predicted based on each graded response curve. With the process repeated for 500 testees to generate the data for parameter estimation. Similarly as described above, using the item parameter defined above, the data for cross-validation is generated for 500 testees.

2.3. Estimation of Parameter

The estimation of parameter is based on the FORTRAN program generated by the author using the alternate simultaneous maximum likelihood of the item parameter and the latent feature value $\theta$ for both models. For the partial test score model, not only the alternate simultaneous maximum likelihood, but also the vicinity maximum likelihood of the item parameter can be realized. However, since the estimation program of the graded response model corresponds only to the alternate simultaneous maximum likelihood, the item parameter is obtained by maximum likelihood for both model with the convenience in comparison taken into account (results are omitted, but there is not a large difference between the vicinity maximum likelihood and the alternate simultaneous estimation for the partial test score model). In both models, the estimated values of $\theta$ and difficulty level are in the range of −3.5 to 3.5, and the range of the estimated value of the identifiability is 0.02 to 2.0.

2.4. Result and Study of Simulation

Table 1 shows the correlation of true values of the ability parameter of the simulation data (hereinafter referred to as partial score data) generated from the partial test score model and the estimated value of $\theta$ estimated using the correct answer number score and both models. The correlation is obtained from the Kendall order correlation coefficient (hereinafter the correlation refers to the Kendall order correlation unless otherwise specified). The order correlation, not the normally used Pearson's moment correlation, is obtained because the problem of the inverse phenomenon between the correct answer number score and the estimated value frequently occurs in the actual operation of the Item Response Theory. As apparent in Table 1, although the correlation with the true $\theta$ indicates a higher value of the estimated value by the partial test score model, there is almost no difference between the partial test score model and the graded response model. On the other hand, the correlation with the correctly answer a question indicates a higher value of the estimated value by the partial test score model with a larger difference.

Relating to the estimated value of the item parameter of the partial test score model, for example, the mean square error (MSE) of the identifiability for the data set 1 is 0.0014, and the difficulty level is 0.0017, which indicate no problems in precision of the estimated value. Since different models are used in generating data, and it is not determined which values are to be recommended, but the MSE from the identifiability of the graded response model is 0.027, and the difficulty level is 0.31. Relating to the difficulty level, the MSE is computed based on the mean estimated value of the difficulty level of the graded response curve.

Using the estimated value of the partial score data, the results of the cross-validation are compared (Table 2). As with the cross-validation described above, the partial score data indicates a higher value in the correlation with the true value, and the difference between models is expanded relating to the correct answer number score.

Table 3 shows the results of the simulation data (hereinafter referred to as the graded response data) generated using the graded response model. Table 4 shows the result of applying the item parameter estimated based on the data to the cross-validation. These results indicate a higher value for the correlation with the true θ in the graded response model as compared with the partial test score model. However, the difference is not large, and an inverted result is detected in some cased as in the data set 1, 5. Furthermore, the correlation with the true value is somewhat lower as compared with Tables 1 and 2, which indicates that the graded response model is difficult in reproducibility as compared with the partial test score model. Although it is the graded response data, the correlation with the correct answer number score indicates a higher value for the estimated value of the partial test score model than the graded response model. Furthermore, the difference is larger than in the case of the partial score data. The inversion of the order correlation with the total score is more frequently detected in the graded response model. The reason for the inversion is that the intermediate portion in evaluation is relatively lower depending on the item in the graded response curve, and the answer of the item cannot have an influence on the estimation (determination of the estimated value independent of the size of the estimation error) of θ. This phenomenon is common between the graded response model and the multivalued models for modeling the response probability curve for each selection item and category. Therefore, it is necessary to take notice when these models are used. It is obvious that the partial test score model is based on the 2-parameter logistic model. Therefore, a part of inversion for the total score and θ has to be accepted, but the level is reduced.

The estimated value of the item parameter of the graded response model is explained below. For example, the mean square error (MSE) of the identifiability for the data set 1, for example, is 0.2993 while the difficulty level is 0.0636. Thus, the estimation precision of the model is somewhat lower than the partial test score model. The item 8, 15 shown in Table 5 indicate the items of low estimation results in the data set 1. They are too close to each true boundary response curve when no estimation is allowed. In this case, the two boundary response curves are processed together, etc. Depending on which standard is selected, but the present study does not perform this work. In a sense, the necessity of the operation is the problem of the graded response model. Although different models, the MSE of the identifiability of the partial test score model is 0.0136, which is rather a good estimated value than that of the graded response model. However, since there is the possibility of the improvement of the result in the vicinity maximum likelihood for the estimation of the item parameter of the graded response model, the more detailed explanation is omitted here, but is left to another study.

In sum, under the conditions of the simulation of the present study, the correlation with the true value in either the partial score or the graded response data has no large difference. On the other hand, a higher result is indicated relating to the correlation with the correct answer number score by the partial test score model. Especially, contrary to the prediction, a large difference is detected for the graded response data. There is no inapplicability in the cross-validation in the graded response model which has a larger number of item parameters (there is the problem in estimating a parameter, though). The reason for this can be the simple simulation without any noise.

3. Study Using Questionnaire Data 3.1. Estimation of Questionnaire Data and Parameter The data to be analyzed in this study is the data of 1849 junior high school and high school students in the basic research of youth in prefecture O based on the nine items searched on the psychological distance between teachers and students (Table 6). Each item requires evaluation in 4 steps of "1. certainly yes" to "4. not at all". The smaller the value is in nine items, the shorter the psychological distance. In the partial test score model, the data is processed as the partial score from 0 to 1, each answer result is defined as x, and is converted into $r=(x-1)/3$ to obtain partial score data of four steps of 0, $\frac{1}{3}$, $\frac{2}{3}$, and 1. The estimating method is the same as that in the simulation. Contact Kihara, et al. (1997) for the details of this study.

3.2. Result and Study of Questionnaire Data

The identifiability of the graded response model is totally higher than the partial test score model (Table 7). The similar phenomenon is detected when data is binarized and analyzed in the normal 2-parameter logistic model. For example, in the case of 4 step evaluation, the binarization is performed by changing the step 2 into 1 and the step 3 into 4. The "binary model" on Table 7 is the result of the data conversion. As compared with the partial test score model, a somewhat higher identifiability is obtained. The phenomenon is more clearly indicated by the comparison between 4 values and 2 values used on the average answer results of the groups of the item 4 shown in FIG. 1. When the FIG. 1 is generated, all answers are changed into the values of 0 to 1. According to the figure, the binarization of multivalued data has a large influence on the estimated value of the identifiability. Since the boundary response curve is practically defined and estimated based on the data obtained by binarizing multivalued answers, the binarization and the similar phenomenon may have occurred. However, in the result of the simulation, there is a doubt in determining the binarization to be the cause because the estimated value of the identifiability of the partial test score model and the estimated value of the identifiability of the graded response model are not largely different.

Another possibility is a difference in the number of test items. In the simulation, there are 40 items while there are nine items in the questionnaire. The difference can work. Therefore, a simulation is added. Using only 10 items from the data set of the graded response data, an alternate simultaneous estimated value is obtained from the graded response model. The value of the identifiability is shown in Table 8. When the number of items are clearly decreased, the identifiability becomes larger (MSE=0.2647). In the graded response model, it is clear that the bias is applied to the estimation of the identifiability with a smaller number of items, but it is to be clear whether the reason is the model or the estimation method. That is, there is the possibility that the estimation is affected not by the graded response model, but by the simultaneous maximum likelihood (it is well known that the estimated value of the item parameter in the simultaneous maximum likelihood has no matching feature). Therefore, although the vicinity maximum likelihood can be computed by the MULTILOG (Thissen, 1991), but there is almost no difference in resultant bias (MSE=0.2558). This may indicate that the problem comes from the model, not from the estimating method. According to Table 8, the item 7 apparently indicates the low identifiability of the simultaneous maximum likelihood while the estimated value of MULTILOG indicates a reasonable value. Actually, MULTILOG shows an abnormal estimated value in the difficulty level, and the estimation is not successfully performed. Therefore, the item is deleted from the calculation of MSE.

In the analysis of the partial test score model using 10 items of the partial score data set, the MSE of the alternate simultaneous estimation indicates the identifiability of 0.0094, and the difficulty level of 0.0007 while the vicinity maximum likelihood indicates the identifiability of 0.0032 and the difficulty level of 0.0014 (table 9). In this model, there is no bias detected in the alternate simultaneous estimation and the vicinity maximum likelihood. Table 10 shows the analysis of the questionnaire data using the two models, and the estimation based on the vicinity maximum likelihood. Also according to Table 10, the identifiability is large in the graded response model using the vicinity maximum likelihood as well as a simulation.

It is to be carefully checked that an upper bias is applied to the identifiability in a small number of items in the graded response model. Therefore, it is described in another study. In this study, the result of the simultaneous maximum likelihood shown in Table 7 is further checked. FIG. 2 shows the item response curve of the partial test score model of the item 1. FIG. 3 shows the response curve of the graded response model. When the Kendall's order correlation between the total score of the evaluation result and θ of both models, the correlation of 0.9104 with the graded response model and the correlation of 0.9424 with the partial test score model are obtained (computation is performed on 1588 persons without no answer columns). The correlation with the total score is higher in the partial test score model, and the better reproducibility is indicated as indicated by the result of the simulation. The value of the correlation is close to the value of the correlation of the both models obtained from the simulation of the graded response data. However, it is not determined that the data is generated by the graded response model because, for example, considering the influence of the multidimension when the simulation data is generate, it is easily predicted that not only the correlation between the true value and the estimated value but also the correlation with the number of correct answers (total mark in the case of the questionnaire) decreases.

The data of this study is based on the practical research, and the true values are uncertain. Therefore, it is difficult to determine which model is recommendable. However, in the graded response model, the correlation with the total score is low is to be explained by referring to the inverted order, which is not apparently indicated. Therefore, a user of a model cannot understand the inversion phenomenon, which is to be taken into account when the model is actually used. In any case, from the result of the simulation, (when the conditions of the simulation are observed) there is not a large difference between the two models in estimation of the true value of θ. However, the influence of the bias of the estimated value of the graded response model when the number of items is small is to be studied in more details. In any case, when there is no special interest in the subjects other than the identifiability or difficulty level as an item feature, that is, if there is no interest in the difficulty level in each step of an answer (corresponding to the study using a questionnaire), the partial test score model is simpler and more appropriate than the graded response model which requires estimation using a larger number of complicated parameters. It is obvious that when much interest in each of the steps is taken, it is not limited to the above-mentioned applications.

REFERENCES

Andrich, D., 1978, A Rating Formulation for Ordered Response Categories, Psychometrika, 43, 561–573;
Birnmaum, A., 1968, Some Latent Trait Models and Their Use in Inferring an Examinee's Ability, in F. M. Lord & M. R. Novick (Eds.), Statistical Theories of Mental Test Scores (pp. 395–479), Reading, Mass., Addison-Wesley;
Kihara Takahiro, Tanaka Haruhiko, and Fujimori Susumu, 1997, A Study of High School and Junior High School Students' Maladaptation to Schools, An Analysis Based on Youth Investigation in Okayama Prefecture, Study Reports of the Faculty of Education, Okayama University, 104, pp. 105–122;
Fujimori Susumu, 2001, A Method for Treating Partial Scores in Item Response Theory, Papers Presented at the 43rd Annual Meeting of the Japanese Society of Educational Psychology;
Fujimori Susumu, 2002a, A Method for Treating Partial Test Scores in Item Response Theory, preprint;
Fujimori Susumu, 2002b, Partial Test Score Model in Item Response Theory;
Masters, G. N., 1982, A Rasch Model for Partial Credit Scoring, Psychometrika, 47, 149–174, 1982;
Watabe Naoto, Noguchi Hiroyuki, 1999, An Application to Adaptive Tests, Application to Epicritic Test of CAT, 8th Chapter in "Theory for Measuring Organizational Psychology" Samejima, F., 1969, Estimation of Latent Ability Using a Response Pattern of Graded Scores, Psychometrika, Monograph, No. 17;
Thissen, D., 1991, Multilog User's Guide, Chicago, Ill., Scientific Software.

The invention claimed is:

1. A test management server for a test system that includes a first computer having an input and an output; a second computer, connected to the first computer via a network including the Internet, and having an input and an output; and a problem database, accessible by the test management server, for storing a plurality of problems each of which is assigned pre-estimated item parameters including a difficulty level and an identifiability of the problem, wherein the test system presents n problems to one testee so as to estimate the ability θ of the testee from his/her responses to the problems, the test management server being connected to the first and second computers and being configured to:
  in response to a request transmitted from the first computer, select from the problem database n problems to be marked in such a manner that allows a partial score $r_j$ to be given to the testee's response to a problem j, and transmit the selected problems to the first computer, wherein $0 \leq r_j \leq 1$ with 1 being a full mark and $1 \leq j \leq n$;
  store an answer returned from the first computer in response to each of the problems selected from the problem database and transmitted to the first computer;
  in response to a request transmitted from the second computer, read the stored answers and transmit the read answers to the second computer;
  receive, from the second computer, a partial score $r_j$ assigned to the testee's answer transmitted to the second computer, and store the partial score $r_j$; and
  estimate the ability θ of the testee who acquires the partial score $r_j$ on the basis of the stored partial score $r_j$ and the item parameters of the problem j stored in the problem database;
  wherein, in estimating the ability, the partial score $r_j$ is treated as an average value of true-false responses which the testee latently indicates to latent problems to which the testee indicates the correct response of 1 or the wrong response of 0 and that are repeatedly performed $s_j$ times, and, when $P_j(\theta)$ is the probability that the testee can correctly answer the latent problem and when $Q_j(\theta)$ is $1-P_j(\theta)$, the ability $\theta$ of the testee is estimated using the logarithmic likelihood $l_{part}(\theta)$ represented by:

$$l_{part}(\theta) = \sum_{j=1}^{n} s_j(r_j \ln(P_j(\theta)) + (1 - r_j)\ln(Q_j(\theta))). \quad \text{[Equation 40]}$$

2. The test management server according to claim 1, wherein $P_j(\theta)$ is represented as follows using a 2-parameter logistic model:

$$P_j(\theta) = \frac{1}{1 + \exp(-Da_j(\theta - b_j))} \quad \text{[Equation 41]}$$

where $a_j$ and $b_j$ respectively indicate the identifiability and the difficulty level which are the proper feature of the problem stored in the problem database, and D is a constant of 1.7.

3. The test management server according to claim 2, characterized in that when the observed partial score $r_j$ for the problem j is configured by an average of a plurality of manifest true-false problems, the correct answer rate of these true-false problems is represented by Equation 41, and the ability $\theta$ of a testee can be estimated using Equation 40.

4. The test management server according to claim 3, characterized in that the ability distribution of a group on which a test is conducted is assumed, the product of the binomial distribution, which is a true-false sum of $s_j$, and the assumed ability distribution is integrated by the dimension of the ability to obtain the theoretical distribution function of a partial score, and the $s_j$, which is the iterations of latent problems, can be estimated such that the obtained theoretical distribution function can best match the empirical distribution function of the partial score of the actual data.

5. The test management server according to claim 3, characterized in that the output and the input of the first and second computers respectively comprise a voice output and a voice input, and an answer transmitted to, and stored by, the test management server includes voice data.

6. The test management server according to claim 2, characterized in that the ability distribution of a group on which a test is conducted is assumed, the product of the binomial distribution, which is a true-false sum of $s_j$, and the assumed ability distribution is integrated by the dimension of the ability to obtain the theoretical distribution function of a partial score, and the $s_j$, which is the iterations of latent problems, can be estimated such that the obtained theoretical distribution function can best match the empirical distribution function of the partial score of the actual data.

7. The test management server according to claim 2, characterized in that the output and the input of the first and second computers respectively comprise a voice output and a voice input, and an answer transmitted to, and stored by, the test management server includes voice data.

8. The test management server according to claim 1, characterized in that the ability distribution of a group on which a test is conducted is assumed, the product of the binomial distribution, which is a true-false sum of $s_j$, and the assumed ability distribution is integrated by the dimension of the ability to obtain the theoretical distribution function of a partial score, and the $s_j$, which is the iterations of latent problems, can be estimated such that the obtained theoretical distribution function can best match the empirical distribution function of the partial score of the actual data.

9. The test management server according to claim 8, characterized in that the output and the input of the first and second computers respectively comprise a voice output and a voice input, and an answer transmitted to, and stored by, the test management server includes voice data.

10. The test management server according to claim 1, characterized in that the output and the input of the first and second computers respectively comprise a voice output and a voice input, and an answer transmitted to, and stored by, the test management server includes voice data.

11. A method for controlling a test system having a first computer having an input and an output, a second computer, connected to the first computer over a network including the Internet, and having an input and an output, a test management server connected to the first and second computers over the network, and a problem database accessible by the test management server and storing a plurality of problems for which an item parameter including a difficulty level and an identifiability is estimated in advance, with the test system presenting n problems to one testee, and the ability $\theta$ of the testee being evaluated from the response of the testee to the presented n problems, the method comprising:

(1) selecting n problems to be marked in an aspect allowing partial score $r_j$ where $0 \leq r_j \leq 1$ with perfect 1 for the problem j where $1 \leq j \leq n$ from the problem database in response to a request transmitted from the first computer, and transmitting the selected problems to the first computer;

(2) storing an answer returned from the first computer in response to the problem selected from the problem database and transmitted to the first computer;

(3) reading a stored answer in response to a request transmitted from the second computer, and transmitting the read answer to the second computer;

(4) receiving and storing a partial score $r_j$ assigned to the answer transmitted to the second computer from the second computer; and (5) estimating the ability $\theta$ of a testee who acquires the partial score $r_j$ using the stored partial score $r_j$ and the item parameter of the problem j stored in the problem database, wherein $P_j(\theta)$ refers to the probability that the testee can correctly answer the latent problem assuming that the partial score $r_j$ is proper to the problem j and is an average value of true-false responses which the testee latently indicates when the latent problems to which the testee latently indicates a correct response of 1 or an incorrect response of 0 are repeatedly performed $s_j$ times, and, when $Q_j(\theta)$ is $1-P_j(\theta)$, the ability $\theta$ of the testee is estimated using the logarithmic likelihood $l_{part}(\theta)$ represented by:

$$l_{part}(\theta) = \sum_{j=1}^{n} s_j(r_j \ln(P_j(\theta)) + (1 - r_j)\ln(Q_j(\theta))). \quad \text{[Equation 42]}$$

12. The method according to claim 11, characterized in that $P_j(\theta)$ is represented as follows using a 2-parameter logistic model:

$$P_j(\theta) = \frac{1}{1+\exp(-Da_j(\theta-b_j))} \quad \text{[Equation 43]}$$

where $a_j$ and $b_j$ respectively indicate the identifiability and the difficulty level which are the proper feature of the problem stored in the problem database, and D is a constant of 1.7.

13. The method according to claim 12, characterized in that when the observed partial score $r_j$ for the problem j is configured by an average of a plurality of manifest true-false problems, the correct answer rate of these true-false problems is represented by Equation 43, and the ability θ of a testee can be estimated using Equation 42.

14. The method according to claim 13, characterized in that the ability distribution of a group on which a test is conducted is assumed, the product of the binomial distribution, which is a true-false sum of $s_j$, and the assumed ability distribution is integrated by the dimension of the ability to obtain the theoretical distribution function of a partial score, and the $s_j$ which is the iterations of latent problems can be estimated such that the obtained theoretical distribution function can best match the empirical distribution function of the partial score of the actual data.

15. The method according to claim 13, characterized in that the output and the input of the first and second computers respectively comprise a voice output and a voice input, and a stored answer includes voice data.

16. The method according to claim 12, characterized in that the ability distribution of a group on which a test is conducted is assumed, the product of the binomial distribution, which is a true-false sum of $s_j$, and the assumed ability distribution is integrated by the dimension of the ability to obtain the theoretical distribution function of a partial score, and the $s_j$ which is the iterations of latent problems can be estimated such that the obtained theoretical distribution function can best match the empirical distribution function of the partial score of the actual data.

17. The method according to claim 12, characterized in that the output and the input of the first and second computers respectively comprise a voice output and a voice input, and a stored answer includes voice data.

18. The method according to claim 11, characterized in that the ability distribution of a group on which a test is conducted is assumed, the product of the binomial distribution, which is a true-false sum of $s_j$, and the assumed ability distribution is integrated by the dimension of the ability to obtain the theoretical distribution function of a partial score, and the $s_j$ which is the iterations of latent problems can be estimated such that the obtained theoretical distribution function can best match the empirical distribution function of the partial score of the actual data.

19. The method according to claim 18, characterized in that the output and the input of the first and second computers respectively comprise a voice output and a voice input, and a stored answer includes voice data.

20. The method according to claim 11, characterized in that the output and the input of the first and second computers respectively comprise a voice output and a voice input, and a stored answer includes voice data.

21. A computer-readable storage medium on which is stored a computer program that instructs a computer to execute the method according to claim 11.

22. A computer program that instructs a computer to execute the method according to claim 11.

* * * * *

UNITED STATES PATENT AND TRADEMARK OFFICE
CERTIFICATE OF CORRECTION

| | | |
|---|---|---|
| PATENT NO. | : 7,103,508 B2 | Page 1 of 1 |
| APPLICATION NO. | : 10/529263 | |
| DATED | : September 5, 2006 | |
| INVENTOR(S) | : Susumu Fujimori and Hitoshi Yamashita | |

It is certified that error appears in the above-identified patent and that said Letters Patent is hereby corrected as shown below:

On the Title Page, please correct item (73) to read as follows:

Assignee:    BENESSE CORPORATION and SUSUMU FUJIMORI

Signed and Sealed this

Eleventh Day of November, 2008

JON W. DUDAS
*Director of the United States Patent and Trademark Office*